United States Patent
Jiang et al.

(10) Patent No.: US 11,109,356 B2
(45) Date of Patent: Aug. 31, 2021

(54) APPARATUS, SYSTEM AND METHOD OF TRIGGER-BASED RANGING MEASUREMENT

(71) Applicant: INTEL CORPORATION, Santa Clara, CA (US)

(72) Inventors: Feng Jiang, Santa Clara, CA (US); Qinghua Li, San Ramon, CA (US); Yuval Amizur, Kfar-Saba (IL); Jonathan Segev, Tel Mond (IL); Xiaogang Chen, Portland, OR (US); Yuan Zhu, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/500,544

(22) PCT Filed: Mar. 29, 2018

(86) PCT No.: PCT/US2018/025060
§ 371 (c)(1),
(2) Date: Oct. 3, 2019

(87) PCT Pub. No.: WO2018/187145
PCT Pub. Date: Oct. 11, 2018

(65) Prior Publication Data
US 2020/0092850 A1   Mar. 19, 2020

Related U.S. Application Data

(60) Provisional application No. 62/481,845, filed on Apr. 5, 2017.

(51) Int. Cl.
*H04W 72/04* (2009.01)
*G01S 13/76* (2006.01)
(Continued)

(52) U.S. Cl.
CPC .......... *H04W 72/04* (2013.01); *G01S 13/765* (2013.01); *G01S 13/878* (2013.01); *H04L 27/2605* (2013.01)

(58) Field of Classification Search
CPC ..... H04W 72/04; H04W 64/00; H04W 56/00; G01S 13/765; G01S 13/878; G01S 5/0226; G01S 5/0215; H04L 27/2605
See application file for complete search history.

(56) References Cited

U.S. PATENT DOCUMENTS

2011/0261806 A1* 10/2011 Chun ............... H04L 5/0016
370/342
2013/0034003 A1   2/2013 Shapira
(Continued)

OTHER PUBLICATIONS

International Preliminary Report on Patentability for International Application No. PCT/US2018/025060, dated Oct. 17, 2019, 11 pages.

(Continued)

*Primary Examiner* — Hassan Kizou
*Assistant Examiner* — Mahbubul Bar Chowdhury
(74) *Attorney, Agent, or Firm* — Shichrur & Co.

(57) ABSTRACT

For example, an apparatus may include circuitry and logic configured to cause a wireless communication station (STA) to determine a plurality of uplink (UL) sounding groups of STAs; transmit at least one trigger frame to at least one UL sounding group of the plurality of UL sounding groups to trigger a measurement procedure with the UL sounding group, the trigger frame including one or more Identifiers (IDs) to identify one or more STAs of the UL sounding group; to receive one or more UL Null Data Packet (NDP) sounding frames from the one or more STAs of the UL sounding group in response to the trigger frame; to transmit a downlink (DL) NDP Announcement (NDP-A) frame to the (Continued)

plurality of UL sounding groups; and to transmit a DL NDP sounding frame to the plurality of UL sounding groups.

21 Claims, 10 Drawing Sheets

(51) Int. Cl.
*G01S 13/87* (2006.01)
*H04L 27/26* (2006.01)

(56) References Cited

U.S. PATENT DOCUMENTS

| | | | |
|---|---|---|---|
| 2016/0262051 A1* | 9/2016 | Merlin | H04W 72/0413 |
| 2016/0295513 A1 | 10/2016 | Moon et al. | |
| 2016/0366548 A1 | 12/2016 | Wang et al. | |
| 2017/0070914 A1* | 3/2017 | Chun | H04W 28/10 |
| 2018/0343580 A1* | 11/2018 | Xiang | H04W 24/08 |

OTHER PUBLICATIONS

International Search Report and the Written Opinion for International Application No. PCT/US2018/025060, dated Jul. 17, 2018, 14 pages.

Mediatek Inc., 'Specification Framework for TGaz', doc.: IEEE 802.11-17/0462r2, Mar. 15, 2017, 15 pages.

IEEE Std 802.11™-2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

* cited by examiner

APPARATUS, SYSTEM AND METHOD OF TRIGGER-BASED RANGING MEASUREMENT

CROSS REFERENCE

This Application claims the benefit of and priority from U.S. Provisional Patent Application No. 62/481,845 entitled "UPLINK SOUNDING SEQUENCE FOR MULTI-USER (MU) MEASUREMENT PHASE IN 11AZ", filed Apr. 5, 2017, the entire disclosure of which is incorporated herein by reference.

TECHNICAL FIELD

Embodiments described herein generally relate to Multi-User (MU) ranging measurements.

BACKGROUND

Outdoor navigation is widely deployed thanks to the development of various global-navigation-satellite-systems (GNSS), e.g., Global Positioning System (GPS), GALILEO, and the like.

Recently, there has been a lot of focus on indoor navigation. This field differs from the outdoor navigation, since the indoor environment does not enable the reception of signals from GNSS satellites. As a result, a lot of effort is being directed towards solving the indoor navigation problem.

A ranging measurement may include measuring a Round Trip Time (RTT) from a wireless station (STA) to a plurality of other STAs, for example, to perform trilateration and/or calculate the location of the STA.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
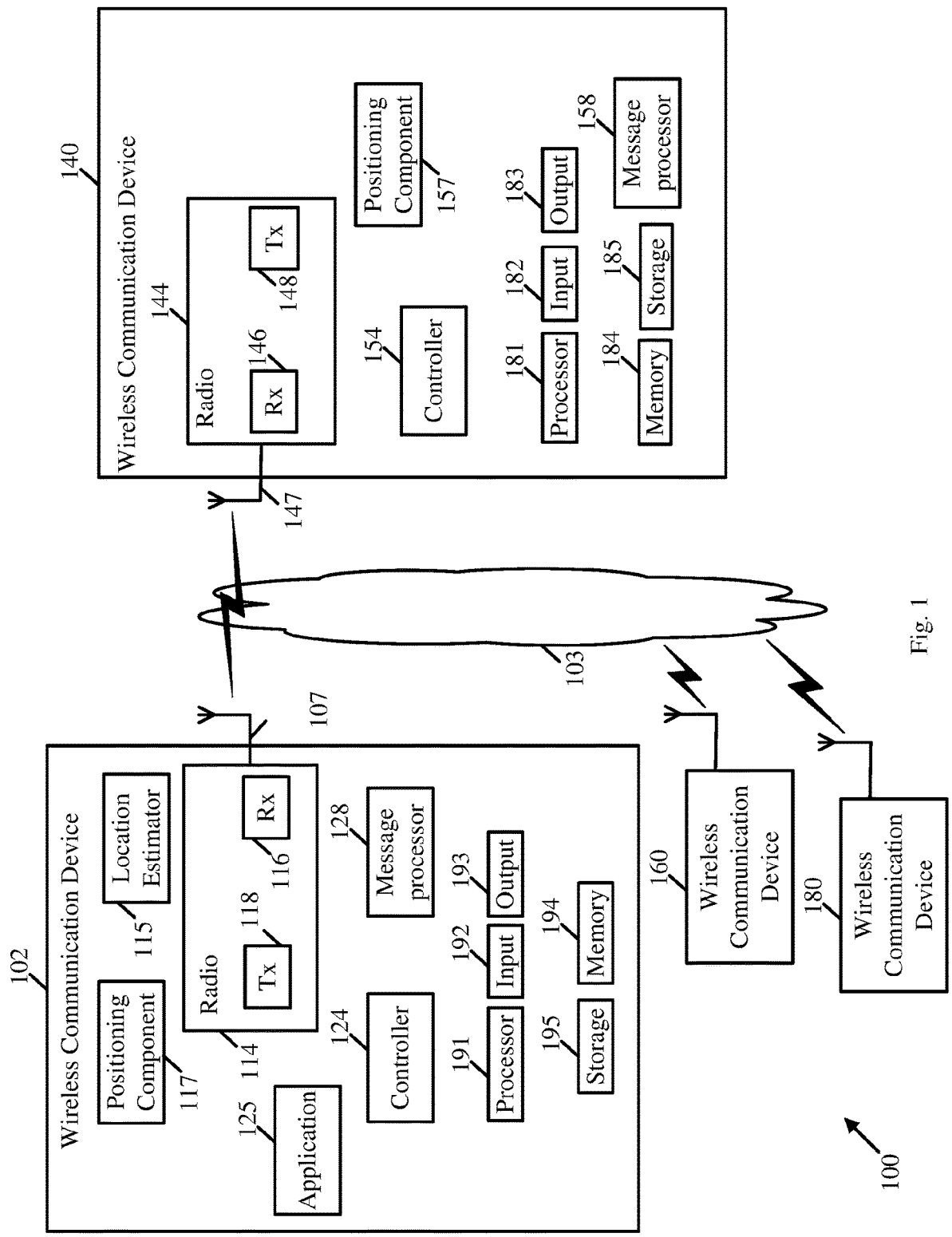
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications*, Dec. 7, 2016); and/or IEEE 802.11az (*IEEE 802.11az, Next Generation Positioning*)) and/or future versions and/or derivatives thereof, devices and/or networks operating in accordance with existing WiFi Alliance (WFA) Specifications (including *Wi-Fi Neighbor Awareness Networking (NAN) Technical Specification, Version* 1.0, May 1, 2015) and/or future versions and/or derivatives thereof, devices and/or networks operating in accordance with existing WFA Peer-to-Peer (P2P) specifications (including *WiFi P2P technical specification, version* 1.5, Aug. 4, 2014) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version* 1.1, April 2011, *Final specification*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102, 140, 160 and/or 180.

In some demonstrative embodiments, wireless communication devices 102, 140, 160 and/or 180 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102, 140, 160 and/or 180 may include, operate as, and/or perform the functionality of one or more STAs. For example, devices 102, 140, 160 and/or 180 may include at least one STA.

In some demonstrative embodiments, devices 102, 140, 160 and/or 180 may include, operate as, and/or perform the functionality of one or more WLAN STAs.

In some demonstrative embodiments, devices 102, 140, 160 and/or 180 may include, operate as, and/or perform the functionality of one or more Wi-Fi STAs.

In some demonstrative embodiments, devices 102, 140, 160 and/or 180 may include, operate as, and/or perform the functionality of one or more BT devices.

In some demonstrative embodiments, devices 102, 140, 160 and/or 180 may include, operate as, and/or perform the functionality of one or more Neighbor Awareness Networking (NAN) STAs.

In some demonstrative embodiments, at least one of wireless communication devices 102, 140, 160 and/or 180, e.g., device 140, may include, operate as, and/or perform the functionality of an AP STA, and/or one or more of wireless communication devices 102, 140, 160 and/or 180, e.g., device 102, may include, operate as, and/or perform the functionality of a non-AP STA. In other embodiments, devices 102, 140, 160 and/or 180 may operate as and/or perform the functionality of any other STA.

For example, the AP may include a router, a PC, a server, a Hot-Spot and/or the like.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, devices 102, 160 and/or 180 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102, 140, 160 and/or 180 may optionally include other suitable hardware components and/or software components. In some demonstrative embodiments, some or all of the components of one or more of devices 102, 140, 160 and/or 180 may be enclosed in a common housing or packaging, and may be interconnected or operably associated using one or more wired or wireless links. In other embodiments, components of one or more of devices 102, 140, 160 and/or 180 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102, 140, 160 and/or 180 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a WiFi channel, an IR channel, a Bluetooth (BT) channel, and the like.

In some demonstrative embodiments, wireless communication medium 103 may include a wireless communication channel over a 2.4 Gigahertz (GHz) frequency band, or a 5 GHz frequency band, a millimeterWave (mmWave) frequency band, e.g., a 60 GHz frequency band, a Sub-1 GHz (S1G) band, and/or any other frequency band.

In some demonstrative embodiments, devices 102, 140, 160 and/or 180 may include one or more radios including circuitry and/or logic to perform wireless communication between devices 102, 140, 160 and/or 180, and/or one or more other wireless communication devices. For example, devices 102, 160 and/or 180 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a 2.4 GHz band, a 5 GHz band, an mmWave band, a S1G band, and/or any other band.

In some demonstrative embodiments, radios 114 and/or 144 may include, or may be associated with, one or more antennas 107 and/or 147, respectively.

In one example, device 102 may include a single antenna 107. In another example, device may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 160, 180, and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, 160, 180, and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. For example, controller 124 may include a memory to store information processed by the one or more processors of controller 124.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. For example, controller 154 may include a memory to store information processed by the one or more processors of controller 154.

In some demonstrative embodiments, at least part of the functionality of controller 124 may be implemented as part of one or more elements of radio 114, and/or at least part of the functionality of controller 154 may be implemented as part of one or more elements of radio 144.

In other embodiments, the functionality of controller 124 may be implemented as part of any other element of device 102, and/or the functionality of controller 154 may be implemented as part of any other element of device 140.

In some demonstrative embodiments, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a SoC. In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, devices 102, 160, 180 and/or device 140 may include, operate as, perform the role of, and/or perform one or more functionalities of, one or more STAs. For example, devices 102, 160 and/or 180 may include at least one STA, device 140 may include at least one STA, device 160 may include at least one STA, and/or device 180 may include at least one STA.

In some demonstrative embodiments, wireless communication devices 102, 140, 160 and/or 180 may form, or may communicate as part of, a wireless local area network (WLAN).

In some demonstrative embodiments, wireless communication devices 102, 140, 160 and/or 180 may form, or may communicate as part of, a WiFi network.

In other embodiments, wireless communication devices 102, 140, 160 and/or 180 may form, and/or communicate as part of, any other additional or alternative network.

In some demonstrative embodiments, devices 102, 140, 160 and/or 180 may be configured to perform a positioning and/or ranging measurement, e.g., as described below.

In some demonstrative embodiments, devices 102, 140, 160 and or 180 may be configured to perform a Multi User (MU) positioning ("ranging") measurement, e.g., as described below.

In some demonstrative embodiments, device 140 may be configured to perform a MU positioning measurement with devices 102, 160, and/or 180, e.g., as described below.

In some demonstrative embodiments, device 140 may include an AP and/or a responder STA to perform the MU positioning measurement with devices 102, 160, and/or 180, e.g., as described below.

In some demonstrative embodiments, devices 102, 160, and/or 180 may include one or more applications configured to provide and/or to use one or more location based services, e.g., a social application, a navigation application, a location based advertising application, and/or the like. For example, device 102 may include an application 125 to be executed by device 102.

In some demonstrative embodiments, application 125 may use range information between device 102 and device 140, for example, to determine an estimated location of device 102, e.g., with respect to a coordinate system, e.g., a World Geodetic System 1984 (WGS84), and/or a local coordinate system.

In one example, device 102 may include a Smartphone and device 140 may include an AP, which is located in a shop, e.g., in a shopping mall. According to this example, application 125 may use the range information to determine a relative location of device 102 with respect to device 140, for example, to receive sale offers from the shop.

In another example, device 102 may include a mobile device and device 140 may include a responder station, which is located in a parking zone, e.g., of a shopping mall. According to this example, application 125 may use the range information to determine a location of device 102 in the parking zone, for example, to enable a user of device 102 to find a parking area in the parking zone.

In some demonstrative embodiments, device 102 may include a location estimator 115 configured to perform one or more positioning measurements to be used to estimate a location of device 102, e.g., as described below.

In some demonstrative embodiments, location estimator 115 may be configured to determine a location of device 102, for example, using a plurality of ranges from the plurality of other STAs, e.g., by performing trilateration.

In some demonstrative embodiments, location estimator 115 may include circuitry and/or logic, e.g., processor circuitry and/or logic, memory circuitry and/or logic, and/or any other circuitry and/or logic, configured to perform the functionality of location estimator 115. Additionally or alternatively, one or more functionalities of location estimator 115 may be implemented by logic, which may be executed by a machine and/or one or more processors, e.g., as described below.

In some demonstrative embodiments, at least part of the functionality of location estimator 115 may be implemented as part of controller 124.

In other embodiments, the functionality of location estimator 115 may be implemented as part of any other element of device 102.

In some demonstrative embodiments, location estimator 115 may be configured to estimate the location of device 102, for example, based on time based range measurements, for example, with device 140 and/or one or more other devices.

In some demonstrative embodiments, the time based range measurements may be performed using WLAN communications, e.g., WiFi. For example, using WiFi to perform the time based range measurements may enable, for example, increasing an indoor location accuracy of the location estimation of devices 102, 160 and/or 180, e.g., in an indoor environment.

In some demonstrative embodiments, the time based range measurements may include an RTT measurement (also referred to as Time of Flight (ToF) procedure).

In some demonstrative embodiments, a ToF value may be defined as the overall time a signal propagates from a first station, e.g., device 102, to a second station, e.g., device 140, and back to the first station. A distance between the first and second stations may be determined based on the ToF value, for example, by dividing the ToF value by two and multiplying the result by the speed of light.

In some demonstrative embodiments, the ToF measurement procedure may include a Fine Timing Measurement (FTM) procedure.

In some demonstrative embodiments, the ToF measurement procedure may include a Very High Throughput (VHT) ranging measurement procedure.

In some demonstrative embodiments, the ToF measurement procedure may include a High Efficiency (HE) ranging measurement procedure.

In some demonstrative embodiments, the ToF measurement procedure may include any other positioning measurement.

In some demonstrative embodiments, devices 102, 140, 160, and/or 180 may be configured to perform one or more FTM measurements, ToF measurements, positioning measurements and/or communications, ranging measurements and/or communications, proximity measurements and/or communications, location estimation measurements and/or communications.

In some demonstrative embodiments, devices 102, 140, 160, and/or 180 may be configured to perform any other additional or alternative positioning measurements and/or communications, ranging measurements and/or communications, proximity measurements and/or communications, location estimation measurements and/or communications, for example, and/or according to any other additional or alternative procedure and/or protocol, e.g., an Received Signal Strength Indication (RSSI) procedure.

Some demonstrative embodiments are described below with respect to FTM measurements according to an FTM procedure. However, other embodiments may be implemented with respect to any other additional or alternative positioning measurements and/or communications, ranging measurements and/or communications, proximity measurements and/or communications, location estimation measurements and/or communications.

In some demonstrative embodiments, devices 102, 140, 160, and/or 180 may be configured to perform one or more FTM measurements, for example, using WLAN communications, e.g., WiFi. For example, using WiFi to perform time based range measurements, e.g., FTM measurements, may enable, for example, increasing an indoor location accuracy of the mobile devices, e.g., in an indoor environment.

In some demonstrative embodiments, devices 102, 160, and/or 180 may perform the functionality of an initiator device, and device 140 may perform the functionality of a responder device. For example, device 140 may include an AP or a non-AP STA, and/or devices 102, 160, and/or 180 may include a non-AP STA, for example, a mobile device, e.g., a Smartphone, which may perform the FTM protocol with the AP, for example, to determine a location of the mobile device.

In some demonstrative embodiments, device 102 may include a positioning component 117, and/or device 140 may include a positioning component 157, which may be configured to perform one or more positioning measurements, operations and/or communications, e.g., as described below.

In some demonstrative embodiments, positioning components 117 and/or 157 may be configured to perform one or more operations and/or communications of FTM measurements. In other embodiments, positioning components 117 and/or 157 may be configured to perform one or more operations and/or communications of any other positioning measurement.

In some demonstrative embodiments, positioning components 117 and/or 157 may include, or may be implemented, using suitable circuitry and/or logic, e.g., controller circuitry and/or logic, processor circuitry and/or logic, memory circuitry and/or logic, and/or any other circuitry and/or logic, which may be configured to perform at least part of the functionality of positioning components 117 and/or 157. Additionally or alternatively, one or more functionalities of positioning components 117 and/or 157 may be implemented by logic, which may be executed by a machine and/or one or more processors, e.g., as described below.

In some demonstrative embodiments, positioning component 117 may be configured to perform one or more operations of, and/or at least part of the functionality of, message processor 128 and/or controller 124, for example, to trigger communication of one or more FTM messages and/or positioning packets, for example, sounding signals and/or Non-Data Packets (NDPs), e.g., as described below.

In some demonstrative embodiments, positioning component 157 may be configured to perform one or more operations of, and/or at least part of the functionality of, message processor 158 and/or controller 154, for example, to trigger communication of one or more FTM messages and/or positioning packets, for example, sounding signals and/or NDPs, e.g., as described below.

In some demonstrative embodiments, positioning components 117 and/or 157 may be configured to trigger the FTM measurements, for example, periodically and/or or upon a request from an application executed by a device, for example, to determine an accurate location of the device.

In some demonstrative embodiments, positioning components 117 and/or 157 may be configured to perform one or more measurements according to the FTM protocol, e.g., as described below.

In some demonstrative embodiments, positioning components 117 and/or 157 may be configured to perform one or more proximity, ranging, and/or location estimation measurements, e.g., in an indoor location, based on the FTM measurements. For example, the FTM measurements may provide a relatively accurate estimation of location, range and/or proximity, e.g., in an indoor location.

Some demonstrative embodiments are described herein with respect to a positioning component, e.g., positioning components 117 and/or 157, configured to perform measurements according to an FTM protocol and/or procedure. However, in other embodiments, the positioning component may be configured to perform any other additional or alternative type of Time of Flight (ToF) measurements, VHT ranging measurements, HE ranging measurements, ranging measurements, positioning measurements, proximity measurements, and/or location estimation measurements, e.g., according to any additional or alternative protocol and/or procedure.

In some demonstrative embodiments, a ranging measurement protocol, e.g., in accordance with an IEEE 802.11az Specification, may be configured to estimate the RTT between an AP and a STA, for example, to derive range information of the STA, e.g., as described below.

In some demonstrative embodiments, devices 102, 140, 160, and/or 180 may be configured to utilize the FTM Protocol. For example, device 102 may be configured to use the FTM protocol to measure the RTT from a STA implemented by device 102 to a plurality of other STAs, e.g., including device 140, for example, including one or more AP STAs and/or non-AP STAs.

In some demonstrative embodiments, devices 102, 160, and/or 180 may perform a role of and/or the functionality of one or more initiating STAs (ISTA) to initiate a ranging measurement, and/or device 140 may perform a role of and/or the functionality of a responding STA (RSTA) of the ranging measurement.

In some demonstrative embodiments, the FTM protocol may be implemented as part of a Specification or protocol, for example, an IEEE 802.11 Specification, for example, by a task group dealing with WiFi positioning, e.g., IEEE 802.11az—Next Generation positioning.

In some demonstrative embodiments, the FTM protocol may be configured to enable providing, for example, at least improved capacity, support of high density environments, improved scalability, improved accuracy, and/or one or more additional or alternative advantages, and/or benefits.

In some demonstrative embodiments, devices 102, 140, 160, and/or 180 may be configured to utilize a MU ranging Protocol, measurement, and/or procedure, e.g., as described below.

In some demonstrative embodiments, devices 102, 140, 160, and/or 180 may be configured to determine range information based on an RTT measurement, for example, between device 140 and devices 102, 160, and/or 180, e.g., as described below.

In some demonstrative embodiments, devices 102, 140, 160, and/or 180 may be configured to perform one or more operations of a MU sounding sequence, e.g., in accordance with an IEEE 802.11az Specification, e.g., as described below.

Figure 2:
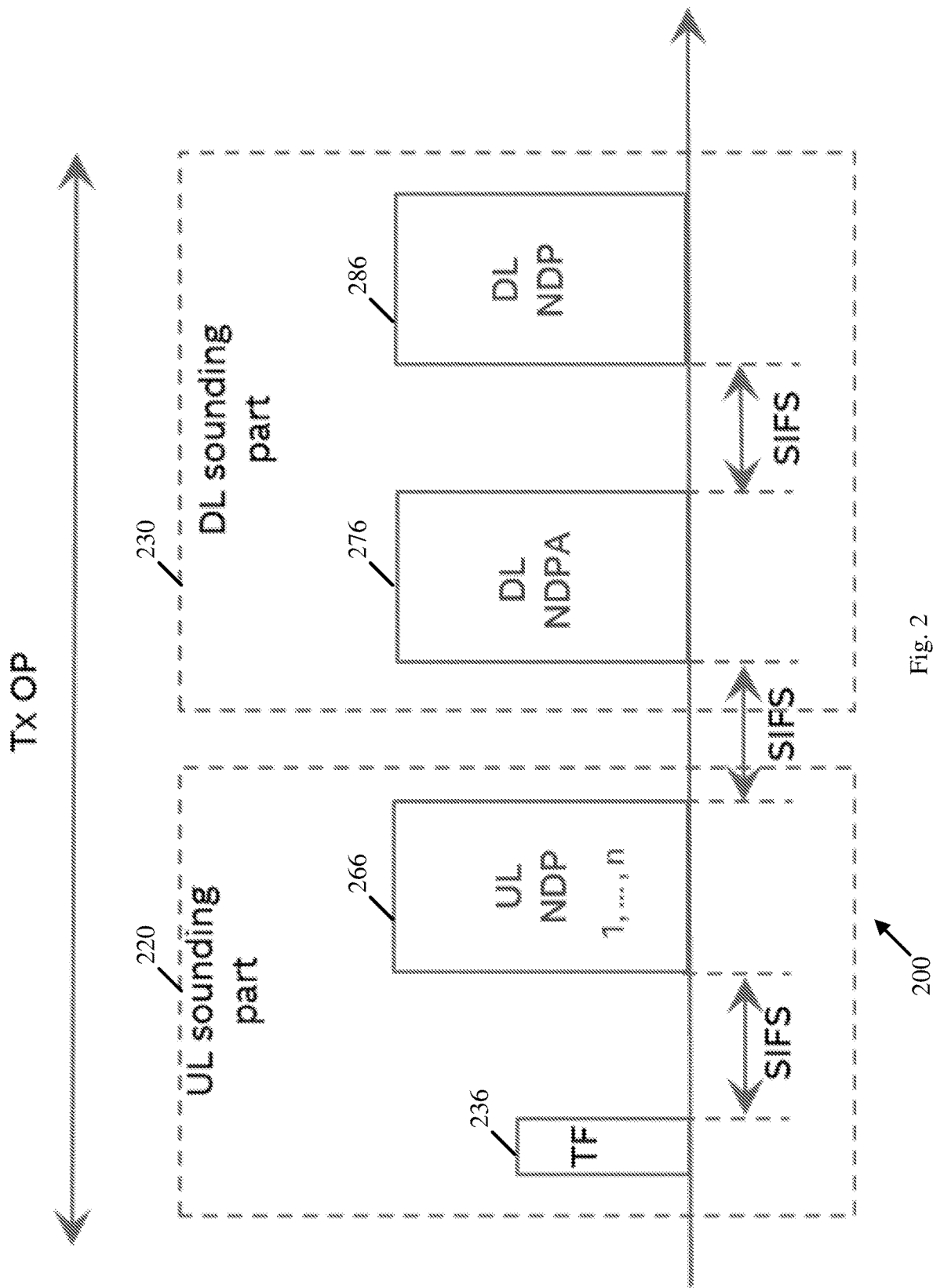
FIG. 2 is a schematic illustration of a Multi User (MU) sounding sequence, which may be implemented in accordance with some demonstrative embodiments.

Reference is made to FIG. 2, which schematically illustrates a MU sounding sequence 200 between a responding STA, e.g., an AP, and a plurality of STAs, e.g., initiating STAs, which may be implemented in accordance with some demonstrative embodiments.

In one example, device 140 (FIG. 1) may be configured to perform one or more operations, the role of, and/or one or more functionalities of a responding STA, e.g., the AP; and/or devices 102, 160 and/or 180 (FIG. 1) may be configured to perform one or more operations, the role of, and/or one or more functionalities of the plurality of STAs.

Some demonstrative embodiments are described herein with respect to a ranging measurement between an AP STA and one or more non-AP STAs. However in other embodiments, the ranging measurement may be implemented between any other first STA and/or second STA, for example, between a first non-AP STA and a second non-AP STA. For example, the ranging measurement may be implemented between an initiating STA (ISTA) and a responding STA (RSTA), which may be a non-AP STA or an AP STA.

In some demonstrative embodiments, the MU sounding sequence 200 may include a sounding sequence including an exchange of packets, e.g., including an exchange of four packets, between the AP and a STA participating in the measurement, e.g., as described below.

As shown in FIG. 2, MU sounding sequence 200 may include an uplink (UL) part 220, and a downlink (DL) part 230, e.g., as described below.

As shown in FIG. 2, the UL part 220 may include transmission of a trigger frame 236, denoted "TF", from the AP to the plurality of STAs, and transmissions of UL Null Data Packets (NDP) sounding frames 266, denoted "UL NDP", from the plurality of STAs to the AP.

As shown in FIG. 2, the DL part 230 may include transmission of a DL NDP Announcement (NDP-A) frame 276, denoted "DL NDPA", from the AP to the plurality of STAs, and transmission of a DL NDP sounding frame 286, denoted "DL NDP", from the AP to the plurality of STAs.

In some demonstrative embodiments, the AP and the STA may estimate Time of Arrival (ToA) information, for example, based on the exchanged packets of the sounding sequence, for example, based on channel sounding and/or channel estimation.

For example, the AP may estimate ToA information of the UL NDP sounding frames 266, for example, based on a channel sounding and/or a channel estimation of the UL NDP sounding frames 266.

For example, the AP may determine ToD information, for example, based on a ToD of DL NDP sounding frame 286.

For example, the AP may feedback the ToA information and/or the ToD information to the plurality of STAs.

For example, a STA of the plurality of STAs participating in the measurement with the AP, may estimate ToA information of the DL NDP sounding frame 286, for example, based on a channel sounding and/or a channel estimation of the DL NDP sounding frame 286.

For example, the STA may determine ToD information, for example, based on a ToD of a UL NDP frame 266 transmitted by the STA.

For example, the STA of the plurality of STAs participating in the measurement with the AP may receive the ToA information and/or the ToD information from the AP, and may determine an RTT between the STA and the AP, for example, based on the ToA information and/or the ToD information from the AP and the ToA and ToD information measured by the STA.

For example, the RTT may be determined, for example, based on the ToD of the UL NDP 266, denoted ToD (ULNDP), the ToA of the UL NDP 266, denoted ToA (ULNDP), the ToD of the DL NDP 286, denoted ToD (DLNDP), and the ToA of the DL NDP 286, denoted ToA (DLNDP), e.g., based on the differences [ToA(DLNDP)–ToD(ULNDP)] and/or [ToD(DLNDP)–ToA(ULNDP)]. Any other additional or alternative calculation and/or ToA/ToD information may be used.

The STA may determine a range between the AP and the STA, e.g., based on the RTT.

In some demonstrative embodiments, a near-far problem, which may be a critical issue, maybe addressed, for example, to ensure a reliable reception of the UL NDP sounding frames 266, e.g., from the plurality of STAs, as described below.

In one example, when a legacy P-matrix multiplexing method is to be used for UL NDP sounding frames 266, the plurality of STAs may transmit simultaneously to the AP.

For example, each STA of the plurality of STAs may use different columns or rows of a P-matrix to mask High Efficiency (HE) Long Training Field (LTF) (HE-LTF) symbols in a time-domain. For example, this may enable the AP to utilize orthogonality between the different columns or rows of the P-matrix, for example, to separate a channel from the plurality of STAs.

According to this example, there may be Radio Frequency (RF) impairments in the transmission of the UL NDP sounding frames 266, for example, if a STA of the plurality of STAs has a residual Carrier Frequency Offset (CFO). As a result, the orthogonality between the different columns or rows of the P-matrix may not be guaranteed, which may result in inter-STA interferences in the channel estimations, e.g., as described below.

In one example, if a first STA is located in a close proximity to the AP and a second STA is located far away from the AP, then the first STA may have a very high received power at the AP, compared to the second STA, which may have a very low received power at the AP, e.g., 30 Decibels (dB) lower than the received power of the first STA. According to this example, the first STA may cause a strong interference to a channel estimation of the second STA, for example, such that a ToA estimation of the second STA may not be accurate.

In some use cases, scenarios and/or implementations, it may not be efficient to implement MU sounding sequence 200, e.g., to ensure reliable reception of the UL NDP sounding frames 266 for a large number of users, for example, due at least to the near-far problem.

In some demonstrative embodiments, MU sounding sequence 200 may be modified and/or enhanced, for example, to address one or more potential inefficiencies, disadvantages and/or technical problems, for example, in some deployments, use cases and/or scenarios, e.g., as described below.

In one example, MU sounding sequence 200 may be modified and/or enhanced, for example, to address at least the near-far problem with respect to the UL NDP transmission, e.g., as described below.

Referring back to FIG. 1, in some demonstrative embodiments, devices 102, 140, 160, and/or 180 may be configured to perform one or more operations and/or communications of a MU ranging protocol (also referred to as a "MU sounding sequence"), which may be configured to provide one or more benefits, to provide one or more advantages and/or to solve one or more of the problems and/or shortcomings of a MU sounding sequence which includes simultaneous transmission of all UL NDPs from all STAs, e.g., as described below.

In some demonstrative embodiments, the MU ranging protocol may be configured to allow solving at least the near-far problem with respect to the UL NDP transmission, e.g., as described below.

In some demonstrative embodiments, the MU ranging protocol may provide an enhanced channel estimation of the UL NDP sounding frames, e.g., with reduced inter-STA interference, which may allow to at least solve the near-far problem, e.g., as described below.

In some demonstrative embodiments, the MU ranging protocol may be configured to support a large amount of users, e.g., as described below.

In some demonstrative embodiments, the MU ranging protocol may support more than eight users in a burst of sounding, for example, compared to a MU sounding, which may support up to eight users. For example, the MU ranging protocol may support as many as possible users, e.g. 30 users or even more users, in one burst of sounding, e.g., with a complete pair of uplink and downlink soundings.

In some demonstrative embodiments, the MU ranging protocol, may be implemented, for example, as part of a future positioning Specification, e.g., an IEEE 802.11az Specification, e.g., as described below.

In some demonstrative embodiments, devices 102, 140, 160, and/or 180 may be configured to form a plurality of UL sounding NDP groups, e.g., in one burst of sounding. According to these embodiments, STAs with similar received powers may be assigned to a same group, and/or STAs with substantially different received powers may be assigned to different groups, for example, such that UL NDPs from the different groups may be separated in a time-domain, e.g., to decrease or even eliminate inter-STA interferences, for example, due to the CFO, e.g., as described below. In other embodiments, the STAs may be grouped into the UL sounding NDP groups according to any additional or alternative criteria.

In some demonstrative embodiments, the MU ranging protocol may be performed between device 140 and a plurality of STAs, e.g., devices 102, 160, and/or 180.

In some demonstrative embodiments, device 140 may be configured to form a plurality of Uplink (UL) sounding groups of STAs, e.g., such that UL NDP sounding frames from each UL sounding group may be separated from other UL NDP sounding groups, e.g., as described below.

In some demonstrative embodiments, device 140 may be configured to determine a plurality of UL sounding groups of STAs, e.g., as described below.

In some demonstrative embodiments, positioning component 157 may be configured to control, cause and/or trigger device 140 to determine the plurality of UL sounding groups, e.g., as described below.

In some demonstrative embodiments, positioning component 157 may be configured to control, cause and/or trigger device 140 to transmit at least one trigger frame to at least one UL sounding group of the plurality of UL sounding groups, e.g., to trigger a measurement procedure with the UL sounding group, e.g., as described below.

In some demonstrative embodiments, positioning component 157 may be configured to include in the trigger frame one or more Identifiers (IDs) to identify one or more STAs of the UL sounding group, e.g., as described below.

In some demonstrative embodiments, the one or more IDs in the trigger frame may include one or more Association IDs (AIDs) and/or one or more ranging IDs (RIDs) to identify the one or more STAs of the UL sounding group, e.g., as described below. For example, the IDs in the trigger frame may be configured to identify associate and/or unassociated STAs. In other embodiments, any other identifiers may be used.

In one example, message processor 158 may generate the trigger frame including the one or more AID or the ranging IDs, and/or transmitter 148 may transmit the trigger frame to the UL sounding group.

In some demonstrative embodiments, positioning component 157 may be configured to control, cause and/or trigger device 140 to receive one or more UL NDP sounding frames from the one or more STAs of the UL sounding group, for example, in response to the trigger frame, e.g., as described below.

In one example, receiver 146 may receive the one or more UL NDP sounding frames from the one or more STAs, and/or message processor 158 may be configured to access, process, and/or decode the one or more UL NDP sounding frames.

In some demonstrative embodiments, the trigger frame may be separated from the one or more UL NDP sounding frames by a Short Interframe Space (SIFS), e.g., as described below.

In other embodiments, the trigger frame may be separated from the one or more UL NDP sounding frames by any other time period.

In some demonstrative embodiments, positioning component 157 may be configured to control, cause and/or trigger device 140 to transmit a DL NDP-A frame to the plurality of UL sounding groups, e.g., as described below.

In some demonstrative embodiments, positioning component 157 may be configured to control, cause and/or trigger device 140 to transmit a DL NDP sounding frame to the plurality of UL sounding groups, e.g., as described below.

In some demonstrative embodiments, positioning component 157 may be configured to control, cause and/or trigger device 140 to determine one or more measurement values of the measurement procedure, for example, based on the one or more UL NDP sounding frames, e.g., as described below.

In some demonstrative embodiments, positioning component 157 may be configured to control, cause and/or trigger device 140 to determine ToA values of the one or more UL NDP sounding frames from the one or more STAs, e.g., as described below.

In some demonstrative embodiments, the UL sounding group may include devices 102 and/or 160.

In some demonstrative embodiments, at least one STA of the UL sounding group, e.g., device 102, may receive the trigger frame from device 140, e.g., as described below.

In some demonstrative embodiments, positioning component 117 may be configured to control, cause and/or trigger device 102 to receive the trigger frame from device 140, e.g., as described below.

In some demonstrative embodiments, positioning component 117 may be configured to control, cause and/or trigger device 102 to transmit to device 140 a UL NDP sounding frame of the plurality of UL NDP sounding frames, for example, based on the one or more IDs in the trigger frame, e.g., as described below.

In some demonstrative embodiments, positioning component 117 may be configured to control, cause and/or trigger device 102 to receive the DL NDP-A frame from device 140 after the UL NDP sounding frame, e.g., as described below.

In some demonstrative embodiments, positioning component 117 may be configured to control, cause and/or trigger device 102 to receive the DL NDP sounding frame from device 140, e.g., after the DL NDP-A frame, e.g., as described below.

In some demonstrative embodiments, the trigger frame may include P-matrix code allocation information to indicate P-matrix codes of a P-matrix to be used by the one or more STAs for transmission of symbols, e.g., HE-LTF symbols, of the one or more UL NDP sounding frames, e.g., as described below.

In some demonstrative embodiments, the trigger frame may include an indication of a LTF size, a Guard Interval (GI) size, and/or a Cyclic Prefix (CP) size, e.g., as described below.

In some demonstrative embodiments, device 102 may be configured to transmit the HE-LTF symbols of the UL NDP sounding frame based on the indication of the LTF size, the GI size, and/or the CP size, e.g., as described below.

In some demonstrative embodiments, the LTF size may include an LTF size of 1×LTF, 2×LTF, 4×LTF, or any other LTF size.

In some demonstrative embodiments, the GI size and/or the CP size may include a GI/CP size of 0.8 microseconds (us), 1.6 us, 3.2 us, or any other GI/CP size.

In some demonstrative embodiments, the trigger frame may include any other additional or alternative information to be used by the STAs, e.g., device 102, for transmission of the UL NDP sounding frames.

In some demonstrative embodiments, each UL sounding group of the plurality of UL sounding groups may include no more than eight STAs.

In some demonstrative embodiments, a number of STAs in a UL sounding group of the plurality of UL sounding groups may be independent on a number of STAs in another UL sounding group of the plurality of UL sounding groups.

In other embodiments, any other number of stations, e.g., less than 8 or more than 8 may be included in a UL sounding group.

In some demonstrative embodiments, device 140 may be configured to assign a plurality of STAs to a plurality of UL sounding groups, for example, based on one or more criteria, e.g., as described below.

In some demonstrative embodiments, an AP, e.g., device 140, may assign (or schedule) STAs, e.g., devices 102, 160 and/or 180, to a plurality of groups, e.g., n groups, for example, such that a group, e.g., each group, may have a certain number of STAs, e.g., with similar received power at the AP or based on any other criterion, e.g., as described below.

In some demonstrative embodiments, the AP may be configured to use at least one trigger frame to solicit the uplink NDP transmissions of the n groups, e.g., as described below.

In some demonstrative embodiments, for example, in order to avoid the near-far problem, the trigger frame may allocate different resources, e.g., a different time slot, for each group, such that, for example, different STA groups may use different resources, e.g., time slots, for the uplink signal transmissions, e.g., as described below.

In some demonstrative embodiments, the AP may be configured to determine the group allocation for a STA, for example, based on a received signal power of the STA, a STA type of the STA, and/or any other additional or alternative criteria, e.g., as described below.

In some demonstrative embodiments, positioning component 157 may be configured to control, cause and/or trigger device 140 to assign one or more STAs to a UL sounding group based on Received Signal Strength Indicators (RSSIs), or any other received signal power parameter, corresponding to the one or more STAs, e.g., as described below.

In some demonstrative embodiments, device 140 may assign one or more first STAs to a first UL sounding group, for example, based on first RSSIs corresponding to the one or more first STAs, and one or more second STAs to a second UL sounding group, for example, based on second RSSIs corresponding to the one or more second STAs, e.g., as described below.

In one example, device 140 may assign one or more first STAs with first RSSIs, e.g., within a first range of RSSIs, to a first UL sounding group, and one or more second STAs with second RSSIs, e.g., within a second range of RSSIs, which are substantially different from the first RSSIs, to a second UL sounding group, for example, such that first UL NDP sounding frames from the first STAs may be separate from second UL NDP sounding frames from the second STAs, e.g., to reduce inter-STA interference.

In one example, devices 102 and/or 160 have an RSSI, e.g., within a first range of RSSIs, and device 180 may have a second RSSI, e.g., substantially different from the RSSIs of devices 102 and 160. According to this example, device 140 may assign devices 102 and 160 to a first UL sounding group, and/or device 180 to a second UL sounding group, for example, such that UL NDP sounding frames from devices 102 and/or 160 may be separated from UL NDP sounding frames from device 180.

In some demonstrative embodiments, the AP may be configured to evaluate a STA's power level and status (for example, whether the STA would want to perform a range estimation or not), for example, before performing the channel sounding. In one example, the AP may determine the power level and/or status of the STA, for example, via a suitable feedback mechanisms, for example, a short NDP feedback mechanism, an uplink Orthogonal Frequency-Division Multiple Access (OFDMA) based polling mechanism, a buffer status report frame from the STA, or any other feedback.

In some demonstrative embodiments, positioning component 157 may be configured to control, cause and/or trigger device 140 to assign one or more STAs to a UL sounding group based on a STA type of the one or more STAs, e.g., as described below.

In some demonstrative embodiments, device 140 may assign one or more first STAs having a first STA type to a first UL sounding group, and one or more second STAs having a second STA type to a second UL sounding group, e.g., as described below.

In some demonstrative embodiments, the first STA type may include a Class A STA type, and the second STA type may include a Class B STA type, for example, in accordance with an IEEE 802.11ax standard, e.g., as described below. In other embodiments, any other additional or alternative STA types may be used.

In some demonstrative embodiments, a STA of the Class A STA type may achieve a more accurate power control in comparison to a STA of the Class B STA type.

In one example, device 140 may assign STAs of the Class A STA type to one or more first UL sounding groups, and STAs of the Class B STA type to one or more second UL sounding groups. For example, the first UL sounding groups may include only the STAs of the Class A STA type, and the second UL sounding groups may include only the STAs of the Class B STA type.

In another example, another UL sounding group may include for example a mix of STAs with different STA types, e.g., STAs of both Class A STA type and Class B STA type. For example, the STAs of this UL sounding group may be grouped based on received power and/or any other criterion.

In one example, assigning STAs to the uplink sounding groups according to the STA type may allow to achieve an effective reduction in power imbalance among the STAs.

In some demonstrative embodiments, a Class B UL sounding group may have a smaller number of STAs compared to a number of STAs in a Class A UL sounding group, e.g., such that a power imbalance among the Class B UL sounding group may be alleviated.

In one example, a Class B UL sounding group may even include only a single STA or only a couple of STAs, e.g., device 102, while a Class A UL sounding group may include more than a single STA, e.g., up to eight STAs or any other number of STAs.

In some demonstrative embodiments, device 140 may determine STA type of the STA, for example, based on an indication from the STA, which may be reported, for example, during an association procedure and/or a negotiation phase.

In other embodiments, device 140 may be configured to assign a plurality of STAs to a plurality of UL sounding groups based on any other additional or alternative criterion, method, and/or determination.

In some demonstrative embodiments, device 140 may be configured to transmit a plurality of trigger frames to a plurality of UL sounding groups, for example, to separate UL NDP sounding frames from each UL sounding group of STAs, e.g., according to a first MU ranging method, e.g., as described below.

In some demonstrative embodiments, device 140 may be configured to transmit a separate trigger frame to solicit uplink NDPs from STAs in a group, e.g., as described below.

In some demonstrative embodiments, device 140 may be configured to transmit at least a first trigger frame to a first UL sounding group of the plurality of UL sounding groups, and a second trigger frame to a second UL sounding group of the plurality of UL sounding groups, e.g., after the first trigger frame, e.g., as described below.

In some demonstrative embodiments, positioning component 157 may be configured to control, cause and/or trigger device 140 to transmit the first trigger frame to the first UL sounding group, e.g., as described below.

In some demonstrative embodiments, positioning component 157 may be configured to control, cause and/or trigger device 140 to include in the first trigger frame one or more IDs to identify one or more STAs of the first UL sounding group, e.g., as described below.

In some demonstrative embodiments, positioning component 157 may be configured to control, cause and/or trigger device 140 to receive one or more first UL NDP sounding frames from the one or more STAs of the first UL sounding group, for example, in response to the first trigger frame, e.g., as described below.

In some demonstrative embodiments, positioning component 157 may be configured to control, cause and/or trigger device 140 to transmit the second trigger frame to the second UL sounding group, e.g., as described below.

In some demonstrative embodiments, positioning component 157 may be configured to control, cause and/or trigger device 140 to include in the second trigger frame one or more IDs to identify one or more STAs of the second UL sounding group, e.g., as described below.

In some demonstrative embodiments, the first trigger frame may be separated from the first UL NDP sounding frames by a first SIFS, and the first UL NDP sounding frames may be separated from the second trigger frame by a second SIFS.

In other embodiments, the first trigger frame and the first UL NDP sounding frames may be separated by any other time period, and/or the first UL NDP sounding frames and the second trigger frame may be separated by any other time period.

In some demonstrative embodiments, positioning component 157 may be configured to control, cause and/or trigger device 140 to receive one or more second UL NDP sounding frames from the one or more STAs of the second UL sounding group, for example, in response to the second trigger frame.

In some demonstrative embodiments, positioning component 157 may be configured to control, cause and/or trigger device 140 to transmit a DL NDP-A frame to the plurality of UL sounding groups, for example, to both the first and second UL sounding groups, e.g., after the one or more second UL NDP sounding frames, e.g., as described below.

In some demonstrative embodiments, positioning component 157 may be configured to control, cause and/or trigger device 140 to transmit a DL NDP sounding frame to the plurality of UL sounding groups, for example, to both the first and second UL sounding groups, e.g., as described below.

In some demonstrative embodiments, the first UL sounding group may include devices 102 and/or 160, and the second UL sounding group may include device 180.

In some demonstrative embodiments, at least one STA of the first UL sounding group, e.g., device 102, may receive the first trigger frame.

In some demonstrative embodiments, positioning component 117 may be configured to control, cause and/or trigger device 102 to receive the first trigger frame, e.g., from device 140.

In some demonstrative embodiments, positioning component 117 may be configured to control, cause and/or trigger device 102 to transmit to device 140 a UL NDP sounding frame ("first UL sounding frame") of the first UL NDP sounding frames from the first UL sounding group, e.g., in response to the first trigger frame.

In some demonstrative embodiments, positioning component 117 may be configured to control, cause and/or trigger device 102 to receive the DL NDP-A frame, e.g., from device 140.

In some demonstrative embodiments, positioning component 117 may be configured to control, cause and/or trigger device 102 to receive the DL NDP sounding frame, e.g., from device 140.

In some demonstrative embodiments, at least one STA of the second UL sounding group, e.g., device 160, may receive the second trigger frame.

In some demonstrative embodiments, device 160 may transmit to device 140 a UL NDP sounding frame ("second UL sounding frame") of the second UL NDP sounding frames from the second UL sounding group, e.g., in response to the second trigger frame.

In some demonstrative embodiments, device 160 may receive the DL NDP-A frame and the DL NDP sounding frame, e.g., from device 140.

Figure 3:
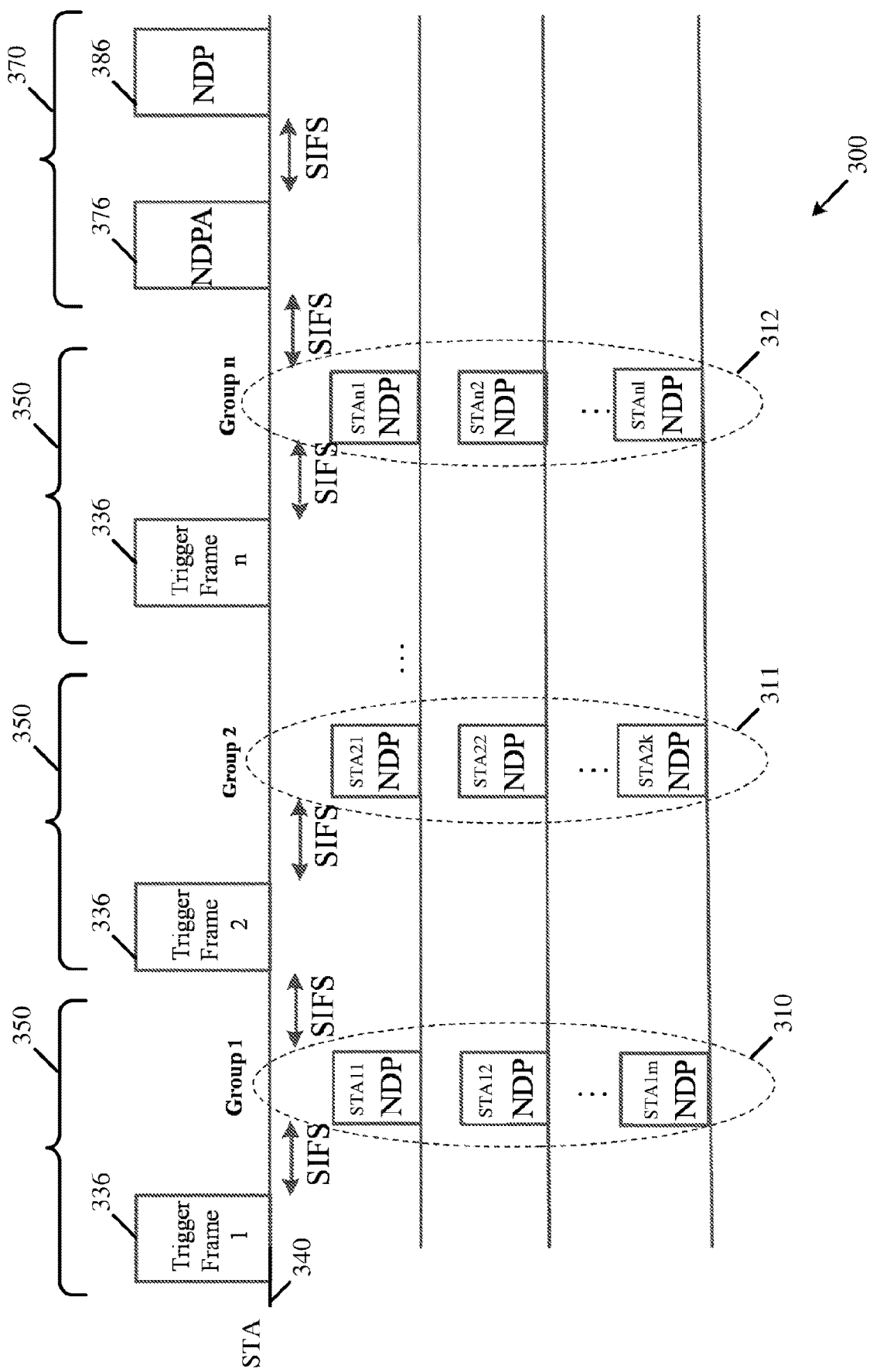
FIG. 3 is a schematic illustration of a MU ranging protocol, in accordance with some demonstrative embodiments.

Reference is made to FIG. 3, which schematically illustrates a MU ranging protocol 300, in accordance with some demonstrative embodiments.

In some demonstrative embodiments, as shown in FIG. 3, MU ranging protocol 300 may include exchanging one or more messages between a wireless communication STA 340, and a plurality of UL sounding groups, denoted "Group 1", "Group 2", and "Group n".

In one example, device 140 (FIG. 1) may be configured to perform one or more operations, the role of, and/or one or more functionalities of STA 340.

In some demonstrative embodiments, as shown in FIG. 3, MU ranging protocol 300 may include a plurality of UL sounding rounds 350 followed by a DL sounding round 370.

In some demonstrative embodiments, as shown in FIG. 3, the plurality of UL sounding rounds 350 may include transmission from STA 340 of a respective plurality of trigger frames 336, denoted "Trigger Frame 1", "Trigger Frame 2", and "Trigger Frame n", to the plurality of UL sounding groups.

In some demonstrative embodiments, as shown in FIG. 3, a UL sounding round 350 may include transmission of a trigger frame 336 from STA 340 to a UL sounding group of the plurality of UL sounding groups, followed by transmission of one or more UL NDP sounding frames from the UL sounding group, e.g., as described below.

In some demonstrative embodiments, as shown in FIG. 3, the plurality of UL sounding rounds 350 may separate the UL NDP sounding frames from each UL sounding group, for example, in a time-domain, e.g., such that the near-far problem may be avoided, e.g., as described below.

In some demonstrative embodiments, as shown in FIG. 3, DL sounding round 370 may include transmission of DL NDP-A frame 376, denoted "NDPA", and DL NDP sounding frame 386, denoted "NDP", from STA 340 to the plurality of UL sounding groups.

In some demonstrative embodiments, "Group 1" may include a first plurality of STAs, including m STAs denoted STA11 . . . STA1*m*, "Group 2" may include a second plurality of STAs, including k STAs, denoted STA21 . . . STA2*k*, and "Group n" may include a third plurality of STAs, including l STAs, denoted STAn1 . . . STAnl.

In one example, device 102 (FIG. 1) may be configured to perform one or more operations, the role of, and/or one or more functionalities of STA11; device 160 (FIG. 1) may be configured to perform one or more operations, the role of, and/or one or more functionalities of STA12; and/or device 180 (FIG. 1) may be configured to perform one or more operations, the role of, and/or one or more functionalities of STA21.

In some demonstrative embodiments, as shown in FIG. 3, STA 340 may transmit Trigger Frame 1 to Group 1.

In some demonstrative embodiments, Trigger Frame 1 may include one or more IDs to identify the STAs of Group 1.

In some demonstrative embodiments, the STAs of Group 1 may transmit UL NDP sounding frames 310 to STA 340, for example, simultaneously, e.g., a SIFS time after Trigger Frame 1.

In some demonstrative embodiments, as shown in FIG. 3, STA 340 may transmit Trigger Frame 2 to Group 2, for example, after receiving the UL NDP sounding frames 310 from Group 1.

In some demonstrative embodiments, Trigger Frame 2 may include one or more IDs to identify the STAs of Group 2, e.g., as described below.

In some demonstrative embodiments, the STAs of Group 2 may transmit UL NDP sounding frames 311 to STA 340, for example, simultaneously, e.g., a SIFS time after Trigger Frame 2.

In some demonstrative embodiments, as shown in FIG. 3, STA 340 may transmit Trigger Frame n to Group n, and the STAs of Group n may transmit UL NDP sounding frames 312 to STA 340, for example, simultaneously, e.g., a SIFS time after Trigger Frame n.

In some demonstrative embodiments, as shown in FIG. 3, STA 340 may transmit DL NDP-A frame 376 to the plurality of UL sounding groups, including Groups 1, 2, and n, e.g., a SIFS time after receiving UL NDP sounding frames 312.

In some demonstrative embodiments, as shown in FIG. 3, STA 340 may transmit DL NDP sounding frame 386 to the plurality of UL sounding groups, e.g., as described below.

In some demonstrative embodiments, as shown in FIG. 3, the plurality of UL sounding rounds 350 may allow exchanging multiple pairs of trigger and UL NDP frames before the DL sounding round 370, e.g., compared to a MU sounding sequence, in which only one round of UL sounding is performed before a DL sounding part.

In some demonstrative embodiments, MU ranging protocol 300 may support more users, e.g., compared to a MU sounding sequence, which includes only a single UL sounding round.

In some demonstrative embodiments, MU ranging protocol 300 may solve the near-far problem, for example, by separating the UL NDP sounding frames 310, 311 and/or 312, e.g., as describes above.

In some demonstrative embodiments, MU ranging protocol 300 may be configured to allow maintaining compatibility with one or more aspects of an IEEE 802.11ax standard, for example, by allowing reuse of the trigger frame format, the UL NDP sounding frame format and/or the DL NDP sounding frame format.

Referring back to FIG. 1, in some demonstrative embodiments, device 140 may be configured to allocate a plurality of allocations to a plurality of UL sounding groups, e.g., as described below.

In some demonstrative embodiments, positioning component 157 may be configured to control, cause and/or trigger device 140 to include in the trigger frame allocation information to allocate a plurality of allocations to the plurality of UL sounding groups, e.g., as described below.

In some demonstrative embodiments, the allocation information may allocate at least a first allocation for a first UL sounding group, and a second allocation for a second UL sounding group, e.g., as described below.

In some demonstrative embodiments, positioning component 157 may be configured to control, cause and/or trigger device 140 to transmit the trigger frame to the plurality of UL sounding groups, e.g., as described below.

In some demonstrative embodiments, positioning component 157 may be configured to control, cause and/or trigger device 140 to process one or more first UL NDP sounding frames from the first UL sounding group according to the first allocation.

In some demonstrative embodiments, positioning component 157 may be configured to control, cause and/or trigger device 140 to process one or more second UL NDP sounding frames from the second UL sounding group according to the second allocation, e.g., as described below.

In some demonstrative embodiments, the first UL sounding group may include devices 102 and/or 160, and/or the second UL sounding group may include device 180.

In some demonstrative embodiments, at least one STA of the first UL sounding group, e.g., device 102, may receive the trigger frame.

In some demonstrative embodiments, positioning component 117 may be configured to control, cause and/or trigger device 102 to receive the trigger frame, e.g., from device 140.

In some demonstrative embodiments, positioning component 117 may be configured to control, cause and/or trigger device 102 to transmit a UL NDP sounding frame to device 140, e.g., based on the first allocation for the first UL sounding group, e.g., as described below.

In some demonstrative embodiments, at least one STA of the second UL sounding group, e.g., device 180, may receive the trigger frame.

In some demonstrative embodiments, device 180 may be configured to transmit a UL NDP sounding frame to device 140, e.g., based on the second allocation for the second UL sounding group, e.g., as described below.

In some demonstrative embodiments, the plurality of allocations may include a plurality of time-slot allocations for the plurality of UL sounding groups, e.g., as described below.

In some demonstrative embodiments, device 140 may be configured to allocate a plurality of time-slots to the plurality of UL sounding groups, for example, according to a second MU ranging method, e.g., as described below.

In some demonstrative embodiments, device 140 may be configured to allocate the plurality of time-slots to the plurality of UL sounding groups to separate a plurality of UL NDP sounding frames in the time domain, e.g., by using the plurality of time-slot allocations, e.g., as described below.

In some demonstrative embodiments, device 140 may transmit a trigger frame including the plurality of time-slot allocations to the plurality of UL sounding groups, e.g., as described below.

In some demonstrative embodiments, positioning component 157 may be configured to control, cause and/or trigger device 140 to transmit the trigger frame to the plurality of UL sounding groups, e.g., as described below.

In some demonstrative embodiments, positioning component 157 may be configured to control, cause and/or trigger device 140 to include in the trigger frame time-slot allocation information, e.g., to allocate at least a first time slot for a first UL sounding group, and a second time slot for a second UL sounding group, e.g., as described below.

In some demonstrative embodiments, positioning component 157 may be configured to control, cause and/or trigger device 140 to receive, during the first time slot, one or more first UL NDP sounding frames from the first UL sounding group, e.g., as described below.

In some demonstrative embodiments, positioning component 157 may be configured to control, cause and/or trigger device 140 to receive, during the second time slot, one or more second UL NDP sounding frames from the second UL sounding group, e.g., as described below.

In some demonstrative embodiments, positioning component 157 may be configured to control, cause and/or trigger device 140 to transmit an DL NDP-A frame to the plurality of UL sounding groups, e.g., after the one or more second UL NDP sounding frames.

In some demonstrative embodiments, positioning component 157 may be configured to control, cause and/or trigger device 140 to transmit a DL NDP sounding frame to the plurality of UL sounding groups, e.g., after the DL NDP-A frame.

In some demonstrative embodiments, the first UL sounding group may include devices 102 and/or 160, and/or the second UL sounding group may include device 180.

In some demonstrative embodiments, at least one STA of the first UL sounding group, e.g., device 102, may receive the trigger frame from device 140, e.g., as described below.

In some demonstrative embodiments, positioning component 117 may be configured to control, cause and/or trigger device 102 to receive the trigger frame from device 140, e.g., as described below.

In some demonstrative embodiments, positioning component 117 may be configured to control, cause and/or trigger device 102 to transmit a UL NDP sounding frame to device 140, e.g., during the first time slot for the first UL sounding group, e.g., as described below.

In some demonstrative embodiments, at least one STA of the second UL sounding group, e.g., device 180, may receive the trigger frame from device 140, e.g., as described below.

In some demonstrative embodiments, device 180 may transmit a UL NDP sounding frame to device 140, e.g., during the second time slot for the second UL sounding group, e.g., as described below.

Figure 4:
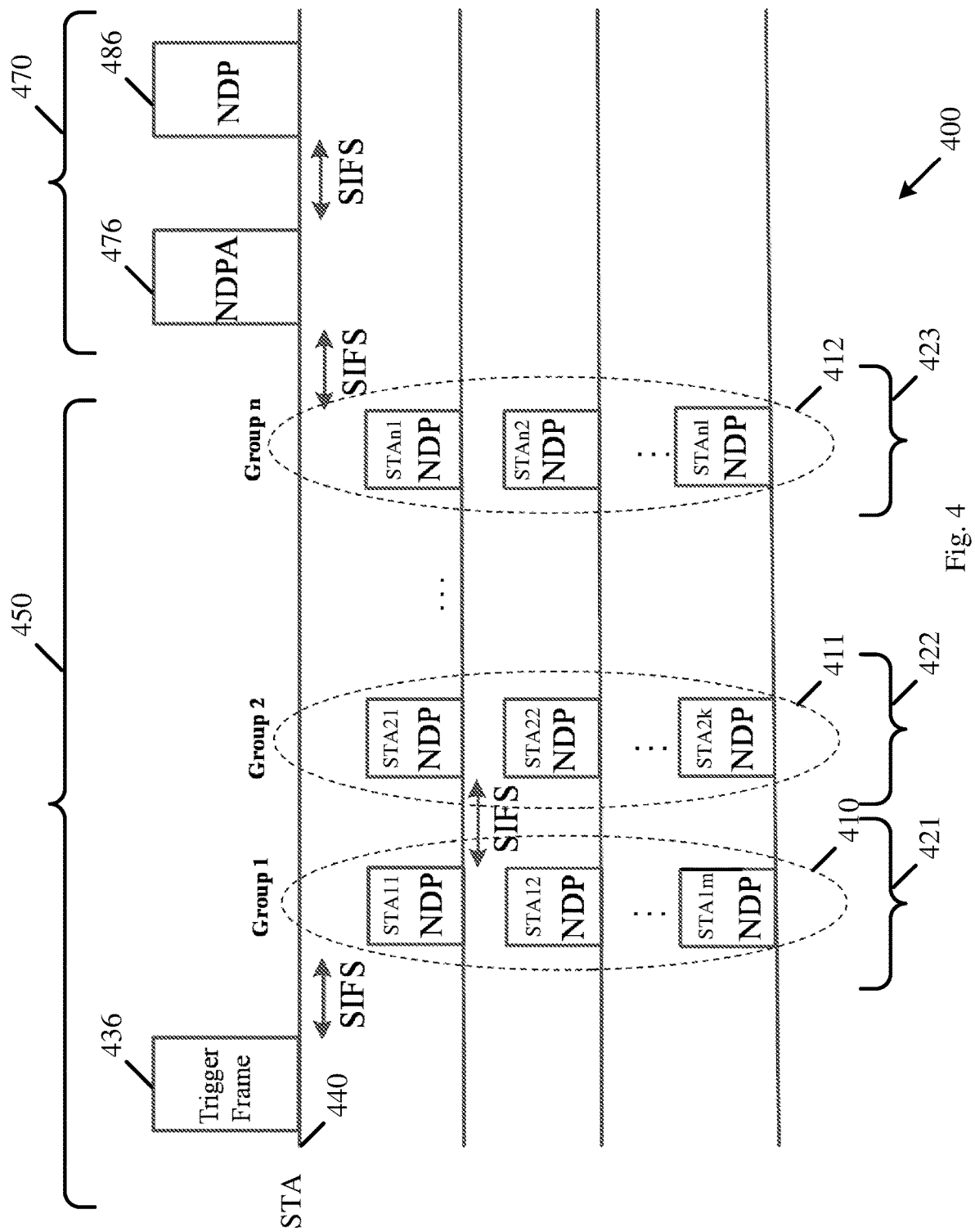
FIG. 4 is a schematic illustration of a MU ranging protocol, in accordance with some demonstrative embodiments.

Reference is made to FIG. 4, which schematically illustrates a MU ranging protocol 400, in accordance with some demonstrative embodiments.

In some demonstrative embodiments, as shown in FIG. 4, MU ranging protocol 400 may include exchanging of one or more messages between a wireless communication STA 440, and a plurality of UL sounding groups, denoted "Group 1", "Group 2", and/or "Group n".

In one example, device 140 (FIG. 1) may be configured to perform one or more operations, the role of, and/or one or more functionalities of STA 440.

In some demonstrative embodiments, as shown in FIG. 4, MU ranging protocol 400 may include a UL sounding round 450 followed by a DL sounding round 470.

In some demonstrative embodiments, the UL sounding round 450 may include a trigger frame 436 from STA 440 to the plurality of UL sounding groups, followed by a plurality of groups of UL NDP sounding frames from the plurality of UL sounding groups, e.g., as described below.

In some demonstrative embodiments, as shown in FIG. 4, UL sounding round 450 may include a plurality of UL NDP sounding frames from a UL sounding group of the plurality of UL sounding groups, e.g., as described below.

In some demonstrative embodiments, as shown in FIG. 4, DL sounding round 470 may include transmission of a DL NDP-A frame 476, denoted "NDPA", and a DL NDP sounding frame 486, denoted "NDP", from STA 440 to the plurality of UL sounding groups.

In some demonstrative embodiments, "Group 1" may include a first plurality of STAs, including m STAs denoted STA11 . . . STA1m, "Group 2" may include a second plurality of STAs, including k STAs, denoted STA21 . . . STA2k, and "Group n" may include a third plurality of STAs, including l STAs, denoted STAn1 . . . STAnl.

In one example, device 102 (FIG. 1) may be configured to perform one or more operations, the role of, and/or one or more functionalities of STA11; device 160 (FIG. 1) may be configured to perform one or more operations, the role of, and/or one or more functionalities of STA12; and/or device 180 (FIG. 1) may be configured to perform one or more operations, the role of, and/or one or more functionalities of STA21.

In some demonstrative embodiments, STA 440 may include in trigger frame 436 time-slot allocation information, e.g., to allocate a plurality of time slots for the plurality of UL sounding groups.

In some demonstrative embodiments, as shown in FIG. 4, the plurality of time slots may separate UL NDP sounding frames from each UL sounding group, for example, in a time domain, e.g., such that the near-far problem may be avoided, e.g., as described below.

In some demonstrative embodiments, as shown in FIG. 4, the time-slot allocation information may allocate at least a first time slot 421 for Group 1, a second time slot 422 for Group 2, and an n-th time slot 423 for Group n, e.g., as described below.

In some demonstrative embodiments, as shown in FIG. 4, STAs of Group 1, Group 2, and Group n may receive trigger frame 436 from STA 440.

In some demonstrative embodiments, as shown in FIG. 4, STAs of Group 1 may transmit UL NDP sounding frames 410, e.g., simultaneously, for example, during the first time slot 421, e.g., a SIFS time after the trigger frame 436.

In some demonstrative embodiments, as shown in FIG. 4, STA 440 may receive the UL NDP sounding frames 410 from the STAs of Group 1, e.g., during the first time slot 421.

In some demonstrative embodiments, as shown in FIG. 4, STAs of Group 2, e.g., including at least STA 480, may transmit UL NDP sounding frames 411, e.g., simultaneously, for example, during the second time slot 422, for example, after the UL NDP sounding frames 410, e.g., a SIFS time after the UL NDP sounding frames 410.

In some demonstrative embodiments, as shown in FIG. 4, STA 440 may receive the UL NDP sounding frames 411 from the STAs of Group 2, e.g., during the second time slot 422.

In some demonstrative embodiments, STAs of Group n may transmit UL NDP sounding frames 412, e.g., simultaneously, for example, during the third time slot 423.

In some demonstrative embodiments, STA 440 may receive the UL NDP sounding frames 412 from the STAs of Group n, e.g., during the third time slot 423.

In some demonstrative embodiments, as shown in FIG. 4, STA 440 may transmit DL NDP-A frame 476 to the plurality of UL sounding groups, including Group 1, Group 2, and Group n, e.g., a SIFS time after the UL NDP sounding frames 412, e.g., as described below.

In some demonstrative embodiments, as shown in FIG. 4, Group 1, Group 2, and Group n may receive DL NDP-A frame 476 from STA 440.

In some demonstrative embodiments, as shown in FIG. 4, STA 440 may transmit DL NDP sounding frame 486 to the plurality of UL sounding groups, including Group 1, Group 2, and Group n, e.g., after DL NDP-A frame 476, e.g., as described below.

In some demonstrative embodiments, as shown in FIG. 4, Group 1, Group 2, and Group n may receive DL NDP sounding frame 486 from STA 440.

Referring back to FIG. 1, in some demonstrative embodiments, device 140 may be configured to allocate by the trigger frame a plurality of allocations, which may include a plurality of P-matrix allocations for the plurality of UL sounding groups, e.g., as described below.

In some demonstrative embodiments, device 140 may be configured to transmit a trigger frame including the plurality of P-matrix allocations to the plurality of UL sounding groups, for example, according to a third MU ranging method, e.g., as described below.

In some demonstrative embodiments, positioning component 157 may be configured to control, cause and/or trigger device 140 to transmit a trigger frame to the plurality of UL sounding groups, e.g., as described below.

In some demonstrative embodiments, the plurality of UL sounding groups may include at least a first UL sounding group and a second UL sounding group, e.g., as described below.

In some demonstrative embodiments, positioning component 157 may be configured to control, cause and/or trigger device 140 to include in the trigger frame at least a first block allocation of a concatenated P-matrix for the first UL sounding group, and a second block allocation of the concatenated P-matrix for the second UL sounding group, e.g., as described below.

In some demonstrative embodiments, the trigger frame may include an allocation of one or more first rows or one or more first columns of the first block allocation for a first STA of the first UL sounding group, and one or more second rows or one or more second columns of the first block allocation for a second STA of the first UL sounding group, e.g., as described below. In one example, a plurality of rows and/or columns may be allocated for a STA implementing multiple antennas and/or multiple spatial streams.

In some demonstrative embodiments, positioning component 157 may be configured to control, cause and/or trigger device 140 to process one or more first UL NDP sounding frames from the first UL sounding group, e.g., based on the first block allocation, e.g., as described below.

In some demonstrative embodiments, positioning component 157 may be configured to control, cause and/or trigger device 140 to process one or more second UL NDP sounding frames from the second UL sounding group, e.g., based on the second block allocation, e.g., as described below.

In some demonstrative embodiments, positioning component 157 may be configured to control, cause and/or trigger device 140 to transmit a DL NDP-A frame to the plurality of UL sounding groups, e.g., after the one or more first and second UL NDP sounding frames.

In some demonstrative embodiments, positioning component 157 may be configured to control, cause and/or trigger device 140 to transmit a DL NDP sounding frame to the plurality of UL sounding groups, e.g., after the DL NDP-A frame.

In some demonstrative embodiments, the first UL sounding group may include devices 102 and/or 160, and/or the second UL sounding group may include device 180.

In some demonstrative embodiments, at least one STA of the first UL sounding group, e.g., device 102, may receive the trigger frame from device 140, e.g., as described below.

In some demonstrative embodiments, positioning component 117 may be configured to control, cause and/or trigger device 102 to receive the trigger frame from device 140, e.g., as described below.

In some demonstrative embodiments, positioning component 117 may be configured to control, cause and/or trigger device 102 to transmit a UL NDP sounding frame to device 140, for example, according to the first block allocation of the concatenated P-matrix for the first UL sounding group, e.g., as described below.

In some demonstrative embodiments, positioning component 117 may be configured to control, cause and/or trigger device 102 to transmit a UL NDP sounding frame to device 140, for example, according to the one or more first rows or the one or more first columns of the first block allocation, e.g., as described below.

In some demonstrative embodiments, at least one STA of the second UL sounding group, e.g., device 180, may receive the trigger frame from device 140, e.g., as described below.

In some demonstrative embodiments, devices 180 may transmit a UL NDP sounding frame to device 140, according to the second block allocation of the concatenated P-matrix for the second UL sounding group, e.g., as described below.

Figure 5:
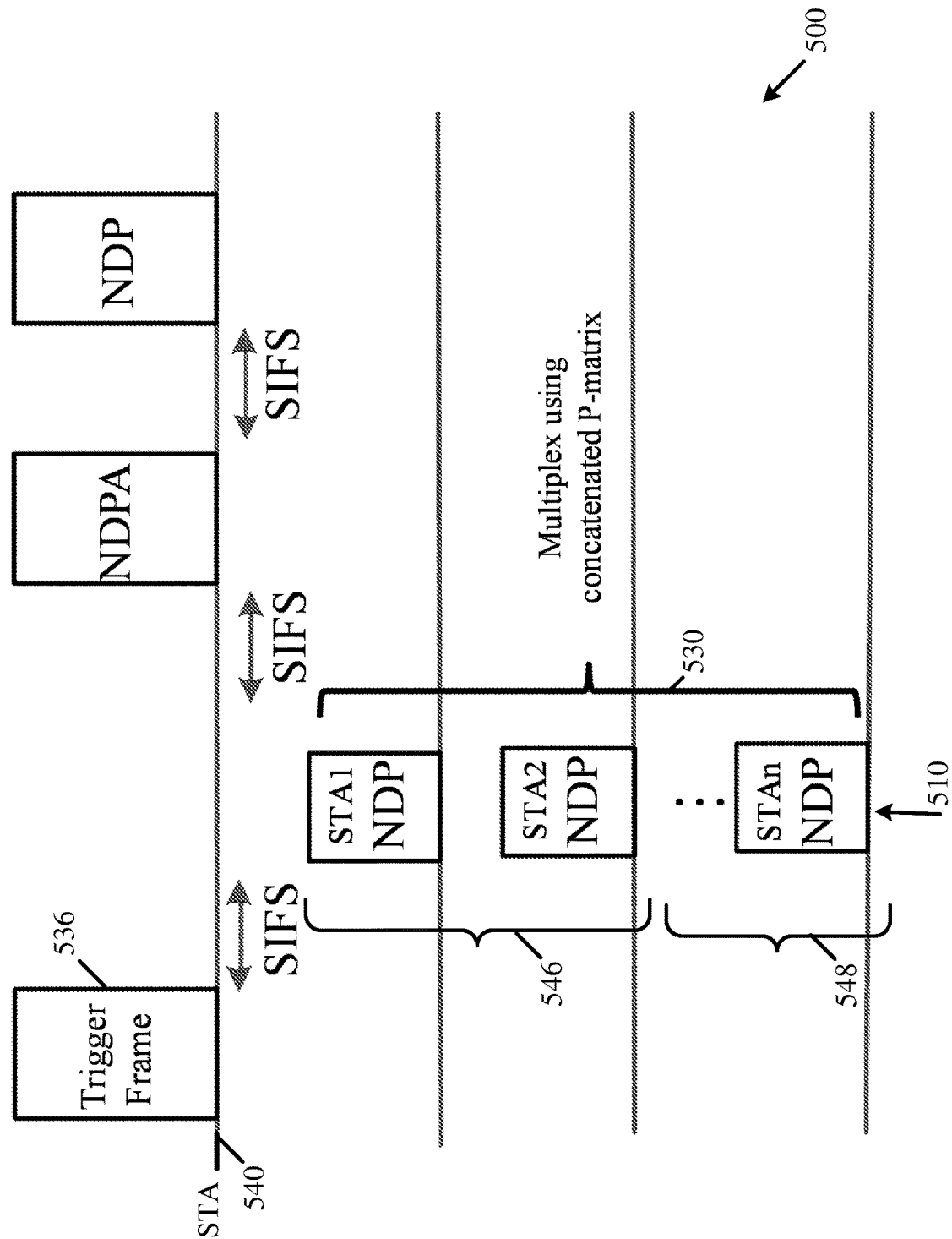
FIG. 5 is a schematic illustration of a MU ranging protocol, in accordance with some demonstrative embodiments.

Reference is made to FIG. 5, which schematically illustrates a MU ranging protocol 500, in accordance with some demonstrative embodiments.

In some demonstrative embodiments, as shown in FIG. 5, MU ranging protocol 500 may include exchanging of one or more messages between a wireless communication STA 540, and a plurality of UL sounding groups 530.

In one example, device 140 (FIG. 1) may be configured to perform one or more operations, the role of, and/or one or more functionalities of STA 540.

In some demonstrative embodiments, as shown in FIG. 5, the plurality of UL sounding groups 530 may include at least a first UL sounding group 546 and/or a second UL sounding group 548.

In some demonstrative embodiments, as shown in FIG. 5, UL sounding group 546 may include at least a first STA, denoted STA1, and/or a second STA, denoted STA2, and/or second UL sounding group 548 may include at least a third STA, denoted STA3. In one example, devices 102, 160 and/or 180 (FIG. 1) may be configured to perform one or more operations, the role of, and/or one or more functionalities of STA1, STA2, and/or STA3, respectively.

In some demonstrative embodiments, as shown in FIG. 5, MU ranging protocol 500 may include a trigger frame 536 from STA 540 to the plurality of UL sounding groups 530.

In some demonstrative embodiments, as shown in FIG. 5, the trigger frame 536 may be followed by transmission of a plurality of UL NDP sounding frames 510 from the plurality of UL sounding groups 530, for example, simultaneously, e.g., as described below.

In some demonstrative embodiments, trigger frame 536 may include a first block allocation of a concatenated P-matrix for the first UL sounding group 546 and a second block allocation of the concatenated P-matrix for the second UL sounding group 548.

In some demonstrative embodiments, the first block allocation may include a first allocation of one or more columns or rows ("first columns/rows") of the concatenated P-matrix for each transmit antenna and/or spatial stream of the first UL sounding group 546, e.g., for masking HE-LTF symbols of the first UL sounding group 546.

In some demonstrative embodiments, the second block allocation may include a second allocation of one or more columns or rows ("second columns/rows") of the concatenated P-matrix for each transmit antenna and/or spatial stream of the second UL sounding group 548, e.g., for masking HE-LTF symbols of the second UL sounding group 548.

In some demonstrative embodiments, as shown in FIG. 5, the first and second UL sounding groups 546 and 548 may receive trigger frame 536 from STA 540.

In some demonstrative embodiments, as shown in FIG. 5, STAs of the UL sounding group 546 may transmit UL NDP sounding frames to STA 540, e.g., based on the one or more first rows or columns of the first block allocation of the concatenated P-matrix for the first UL sounding group 546, e.g., as described below.

In some demonstrative embodiments, STA3 of the UL sounding group 548 may transmit a UL NDP sounding frame to STA 540, e.g., based on the one or more second rows or columns of the second block allocation of the concatenated P-matrix for the second UL sounding group 548, e.g., as described below.

In some demonstrative embodiments, STA 540 may process the one or more UL NDP sounding frames from the first UL sounding group 546, e.g., based on the first block allocation of the concatenated P-matrix for the first UL sounding group 546.

In some demonstrative embodiments, STA 540 may process one or more second UL NDP sounding frames from the second UL sounding group 548, e.g., based on the second block allocation of the concatenated P-matrix for the second UL sounding group 548.

In one example, STA 540 may allocate different block allocations to two STAs, e.g., which are at risk of the near-far problem, for example, such that HE-LTF symbols of the two STAs may be separate in the time domain and not interfere with each other, e.g., to avoid the near-far problem.

In some demonstrative embodiments, MU ranging protocol 500 may be compatible with one or more requirements of an IEEE 802.11ax standard.

In some demonstrative embodiments, MU ranging protocol 500 may utilize a P-matrix with P-matrix codes assigned to each scheduled STA, e.g., as described below.

In some demonstrative embodiments, the P-matrix codes of MU ranging protocol 500 may include values of 0, +1, and/or −1, compared to a P-matrix in compliance with an IEEE 802.11ax Standard using only values of +1, and −1.

In some demonstrative embodiments, the P-matrix codes of the new P-matrix may be longer than P-matrix codes in compliance with an IEEE 802.11ax Standard.

In some demonstrative embodiments, trigger frame 536 may be configured to indicate the structure of the P-matrix and/or the index of the P-matrix codes to be assigned to the scheduled STAs, e.g., as describe below.

Figure 6:
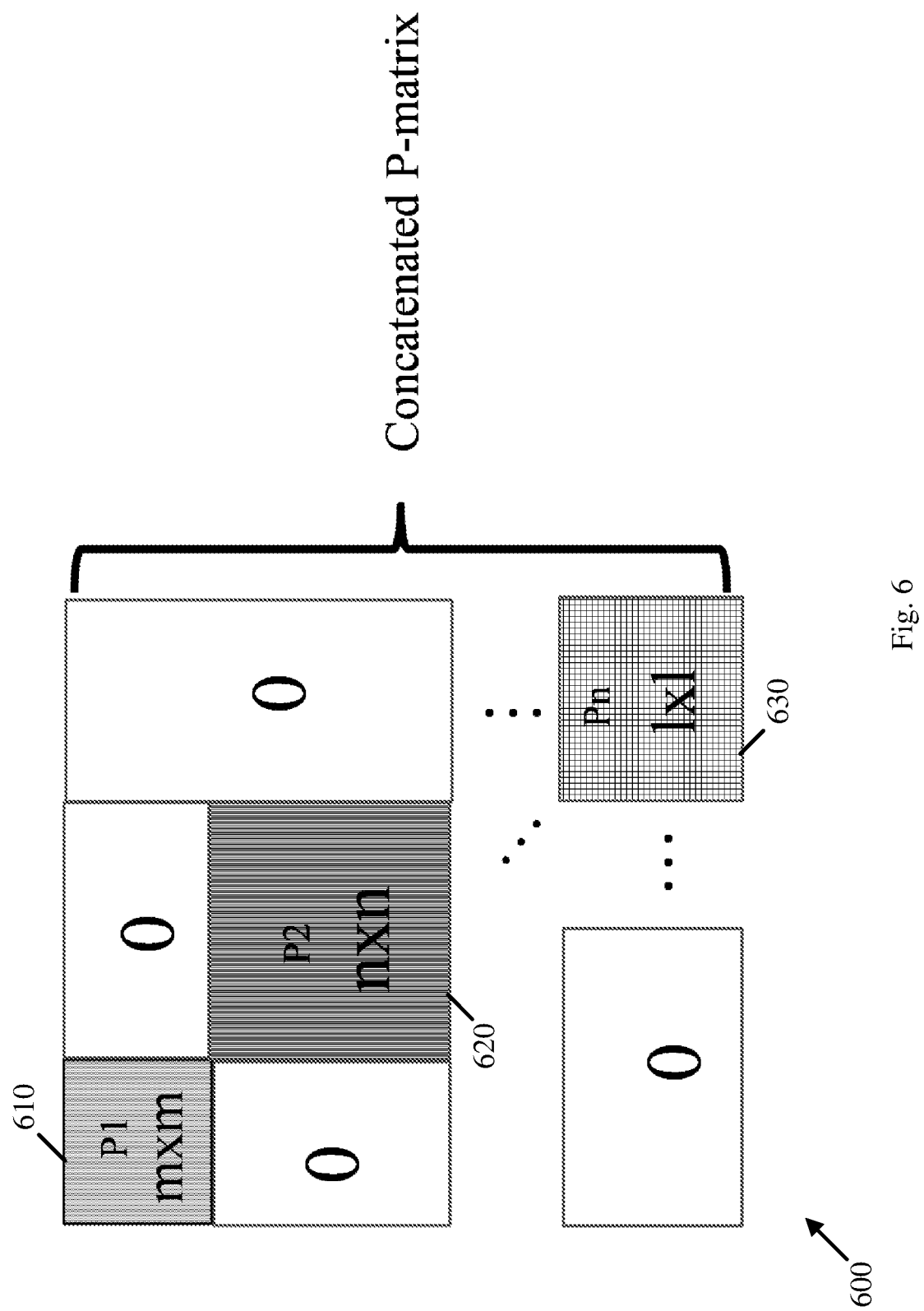
FIG. 6 is a schematic illustration of a concatenated P-matrix, in accordance with some demonstrative embodiments.

Reference is made to FIG. 6, which schematically illustrates a concatenated P-matrix 600, in accordance with some demonstrative embodiments.

In some demonstrative embodiments, as shown in FIG. 6, the concatenated P-matrix 600 may include a block diagonal matrix, which may be composed of one or more P-matrices.

In some demonstrative embodiments, as shown in FIG. 6, concatenated P-matrix 600 may include a plurality of diagonal sub-blocks, e.g., including diagonal sub-blocks 610, 620, and 630, e.g., as described below.

In some demonstrative embodiments, as shown in FIG. 6, diagonal sub-blocks 610, 620, and 630, may include a P-matrix, e.g., having any suitable size.

In one example, if two STAs are allocated columns or rows of a same diagonal sub-block of concatenated P-matrix 600, e.g., sub-block 610, then LTF symbols of the these two STAs may be mixed in the time domain.

In another example, if two STAs are allocated columns or rows of different diagonal sub-block of concatenated P-matrix 600, e.g., sub-blocks 610 and 620, then LTF symbols of the two STAs symbols may be orthogonal in the time domain.

In one example, device 140 (FIG. 1) may allocate sub-block 610 to a first UL sounding group, and sub-block 620 to a second UL sounding group, for example, to avoid interference between STAs of the first and second UL groups.

In one example, trigger frame 536 (FIG. 5) may include the identifiers of the STAs, e.g., the AIDs and/or ranging IDs to identify STAs for a group allocation, and an indication of the concatenated P-matrix code allocations for the STAs.

Figure 7:
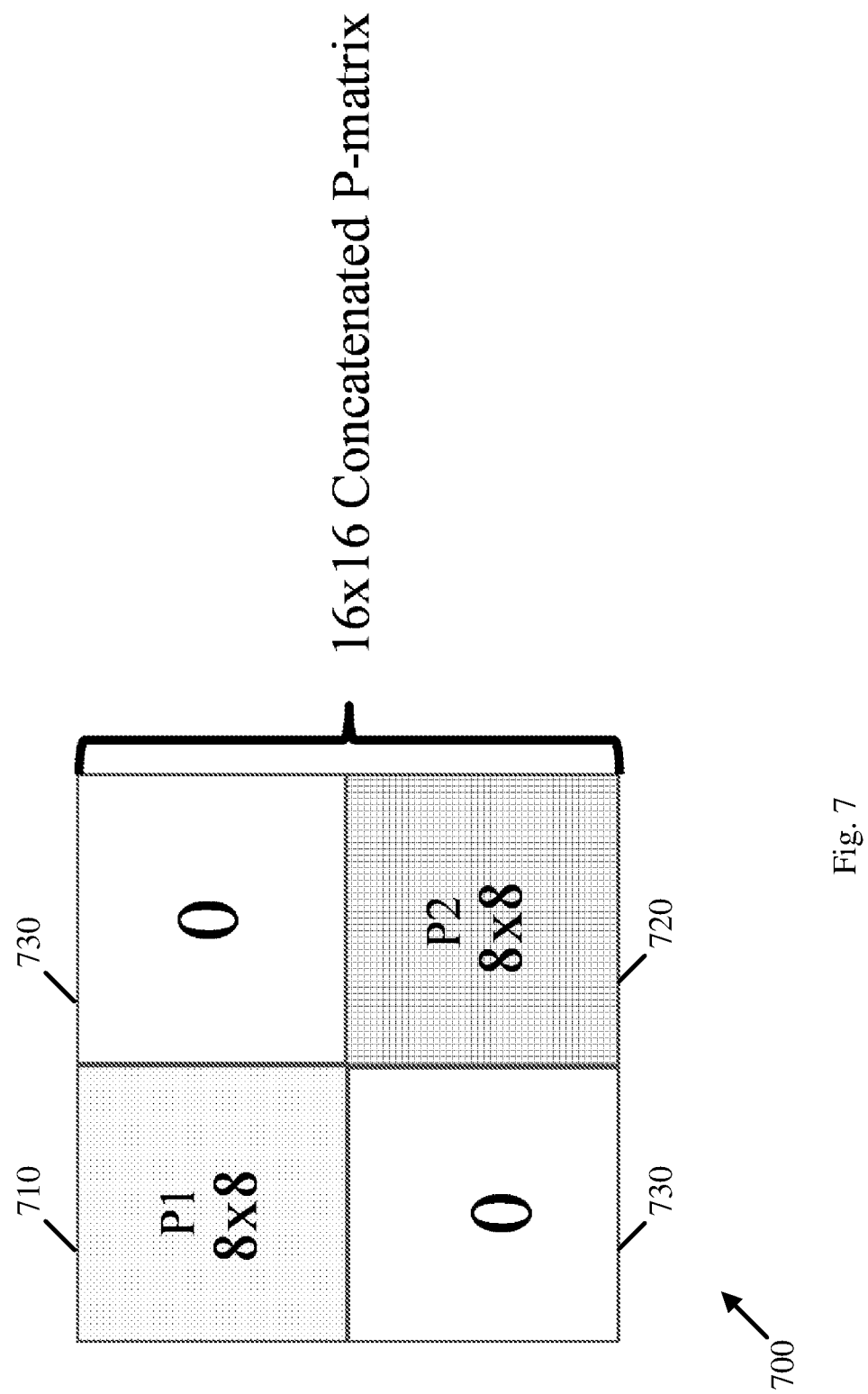
FIG. 7 is a schematic illustration of a concatenated P-matrix, in accordance with some demonstrative embodiments.

Reference is made to FIG. 7, which schematically illustrates a concatenated P-matrix 700, in accordance with some demonstrative embodiments.

In some demonstrative embodiments, as shown in FIG. 7, concatenated P-matrix 700 may include a 16×16 block-diagonal concatenated P-matrix.

In one example, device 140 (FIG. 1) may use P-matrix 700, for example, if device 140 (FIG. 1) plans to estimate a channel of 16 single antenna STAs, e.g., simultaneously. According to this example, device 140 (FIG. 1) may assign an upper sub-block 710 of concatenated P-matrix 700 to a first UL sounding group, and/or a lower sub-block 720 of concatenated P-matrix 700 to a second UL sounding group.

In some demonstrative embodiments, as shown in FIG. 7, sub-blocks 710 and/or 720 may each include 8×8 P-matrices, and/or all other sub-blocks 730 of P-matrix 700 may include zero matrix.

In one example, first STAs, e.g., STAs having a high-received signal power at device 140 (FIG. 1), may be scheduled to sub-block 710, and/or second STAs, e.g., STAs having a low-received signal power at device 140 (FIG. 1), may be scheduled to the sub-block 720. According to this example, the first STAs with the high-received signal power may not interfere the second STAs with the low received signal power, e.g., to avoid the near-far problem.

Figure 8:
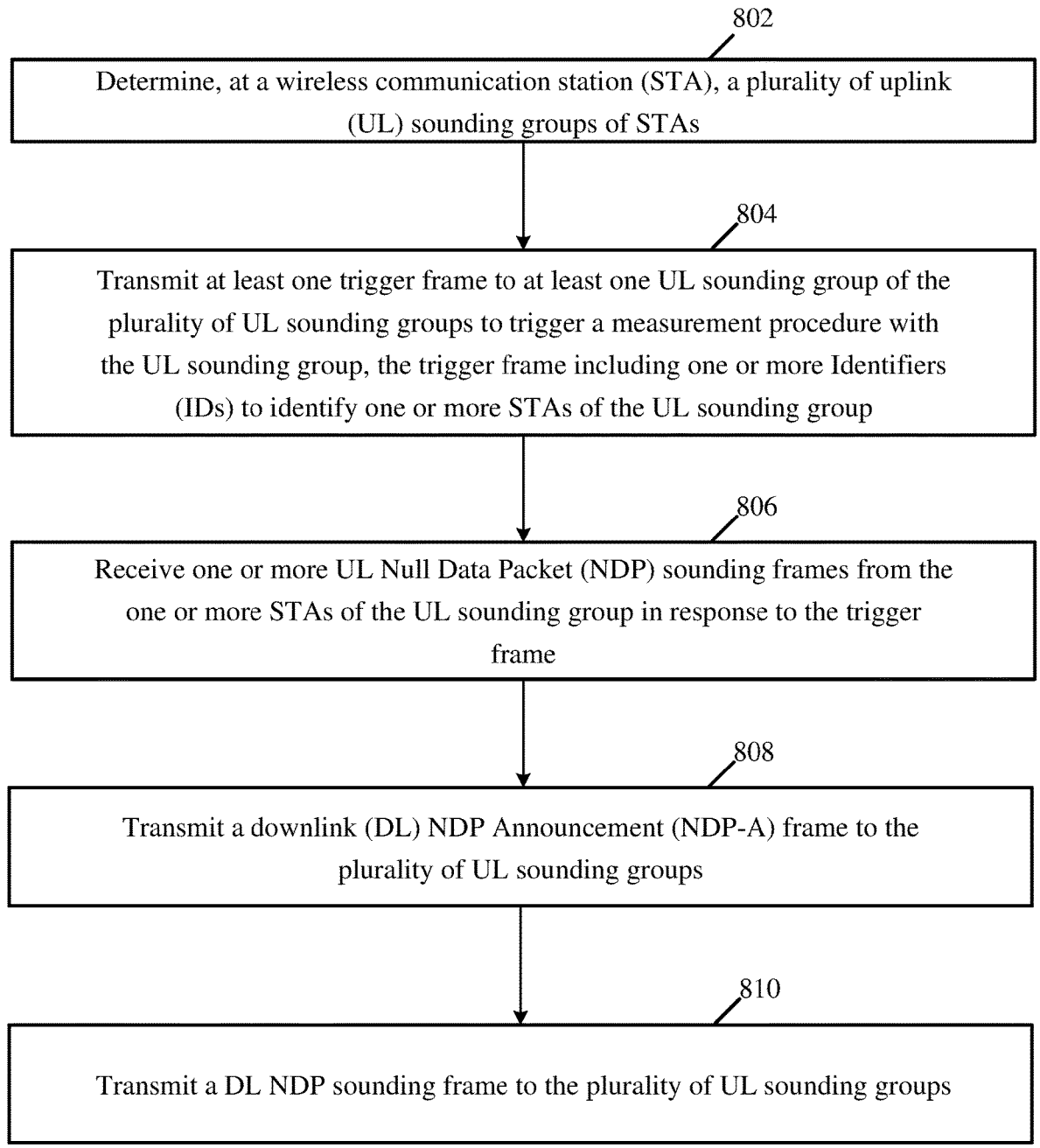
FIG. 8 is a schematic flow-chart illustration of a method of MU ranging, in accordance with some demonstrative embodiments.

Reference is made to FIG. 8, which schematically illustrates a method of MU ranging measurement, in accordance with some demonstrative embodiments. For example, one or more of the operations of the method of FIG. 8 may be performed by a wireless communication system, e.g., system 100 (FIG. 1); a wireless communication device, e.g., devices 102, 140, 160 and/or 180 (FIG. 1); a controller, e.g., controllers 124 and/or 154 (FIG. 1); an application, e.g., application 125 (FIG. 1); a positioning component, e.g., positioning components 117 and/or 157 (FIG. 1); a location estimator, e.g., location estimator 115 (FIG. 1); a radio, e.g., radios 114 and/or 144 (FIG. 1); a message processor, e.g., message processor 128 (FIG. 1) and/or message processor 158 (FIG. 1); a transmitter, e.g., transmitters 118 and/or 148 (FIG. 1); and/or a receiver, e.g., receivers 116 and/or 146 (FIG. 1).

As indicated at block 802, the method may include determining, at a STA, a plurality of UL sounding groups of STAs. For example, controller 154 (FIG. 1) may control, cause and/or trigger device 140 (FIG. 1) to determine the plurality of UL sounding groups of STAs, for example, including the Groups 1, 2, . . . n (FIG. 3), e.g., as described above.

As indicated at block 804, the method may include transmitting at least one trigger frame to at least one UL sounding group of the plurality of UL sounding groups to trigger a measurement procedure with the UL sounding group, the trigger frame including one or more Identifiers (IDs) to identify one or more STAs of the UL sounding group. For example, controller 154 (FIG. 1) may control, cause and/or trigger device 140 (FIG. 1) to transmit Trigger Frame 1 (FIG. 3) to Group 1 (FIG. 3), for example, to trigger a measurement procedure with Group 1 (FIG. 3). For example, Trigger Frame 1 (FIG. 3) may include one or more IDs to identify one or more STAs of Group 1 (FIG. 3), e.g., as described above.

As indicated at block 806, the method may include receiving one or more UL NDP sounding frames from the one or more STAs of the UL sounding group, e.g., in response to the trigger frame. For example, controller 154 (FIG. 1) may control, cause and/or trigger device 140 (FIG. 1) to receive UL NDP sounding frames 310 (FIG. 3) from the one or more STAs of Group 1 (FIG. 3) in response to Trigger Frame 1 (FIG. 3), e.g., as described above.

As indicated at block 808, the method may include transmitting a DL NDP-A frame, e.g., to the plurality of UL sounding groups. For example, controller 154 (FIG. 1) may control, cause and/or trigger device 140 (FIG. 1) to transmit DL NDP-A frame 376 (FIG. 3) to the plurality of UL sounding groups including Groups 1, 2, . . . n (FIG. 3), e.g., as described above.

As indicated at block 810, the method may include transmitting a DL NDP sounding frame, e.g., to the plurality of UL sounding groups. For example, controller 154 (FIG. 1) may control, cause and/or trigger device 140 (FIG. 1) to transmit DL NDP sounding frame 386 (FIG. 3) to the plurality of UL sounding groups including Groups 1, 2, . . . n (FIG. 3), e.g., as described above.

Figure 9:
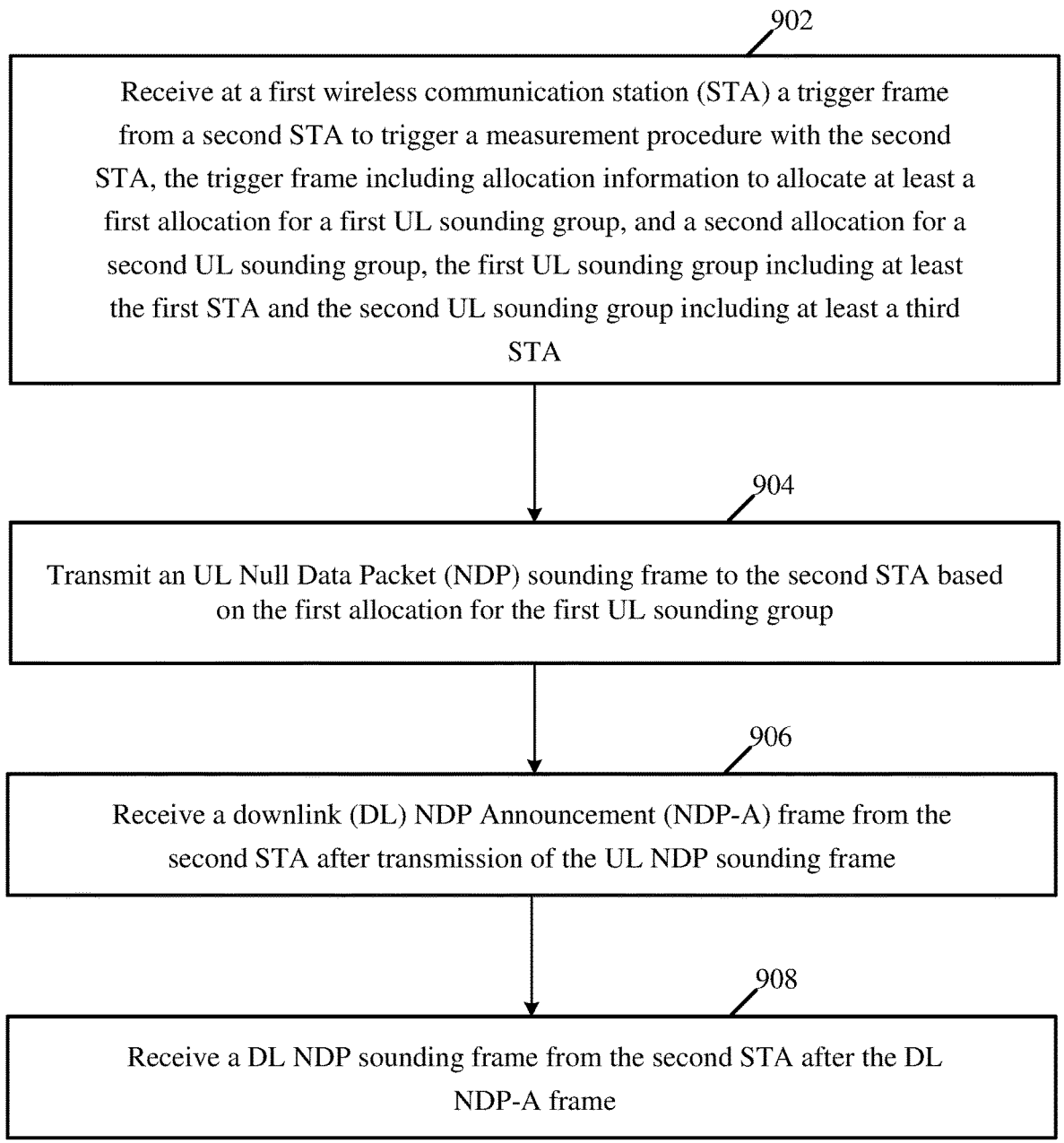
FIG. 9 is a schematic flow-chart illustration of a method of MU ranging, in accordance with some demonstrative embodiments.

Reference is made to FIG. 9, which schematically illustrates a method of MU ranging measurement, in accordance with some demonstrative embodiments. For example, one or more of the operations of the method of FIG. 9 may be performed by a wireless communication system, e.g., system 100 (FIG. 1); a wireless communication device, e.g., devices 102, 140, 160 and/or 180 (FIG. 1); a controller, e.g., controllers 124 and/or 154 (FIG. 1); an application, e.g., application 125 (FIG. 1); a positioning component, e.g., positioning components 117 and/or 157 (FIG. 1); a location estimator, e.g., location estimator 115 (FIG. 1); a radio, e.g., radios 114 and/or 144 (FIG. 1); a message processor, e.g., message processor 128 (FIG. 1) and/or message processor 158 (FIG. 1); a transmitter, e.g., transmitters 118 and/or 148 (FIG. 1); and/or a receiver, e.g., receivers 116 and/or 146 (FIG. 1).

As indicated at block 902, the method may include receiving, at a first STA, a trigger frame from a second STA to trigger a measurement procedure with the second STA, the trigger frame including allocation information to allocate at least a first allocation for a first UL sounding group, and a second allocation for a second UL sounding group, the first UL sounding group including at least the first STA and the second UL sounding group including at least a third STA. For example, controller 124 (FIG. 1) may control, cause and/or trigger device 102 (FIG. 1) to receive trigger frame 436 (FIG. 4) from STA 440 (FIG. 4) to trigger a measurement procedure with STA 402 (FIG. 4), trigger frame 436 (FIG. 4) including allocation information to allocate at least a first allocation 421 (FIG. 4) for Group 1 (FIG. 4) and a second allocation 422 (FIG. 4) for Group 2 (FIG. 4), e.g., as described above.

As indicated at block 904, the method may include transmitting a UL NDP sounding frame to the second STA based on the first allocation for the first UL sounding group. For example, controller 124 (FIG. 1) may control, cause and/or trigger device 102 (FIG. 1) to transmit a UL NDP sounding frame to STA 440 (FIG. 4) based on the first allocation 421 (FIG. 4) for Group 1 (FIG. 4), e.g., as described above.

As indicated at block 906, the method may include receiving a DL NDP-A frame from the second STA, e.g., after transmission of the UL NDP sounding frame. For example, controller 124 (FIG. 1) may control, cause and/or trigger device 102 (FIG. 1) to receive DL NDP-A frame 476 (FIG. 4) from STA 440 (FIG. 4) after transmission of the UL NDP sounding frame, e.g., as described above.

As indicated at block 908, the method may include receiving a DL NDP sounding frame from the second STA, e.g., after the DL NDP-A frame. For example, controller 124 (FIG. 1) may control, cause and/or trigger device 102 (FIG. 1) to receive DL NDP sounding frame 486 (FIG. 4) from STA 440 (FIG. 4) after DL NDP-A frame 476 (FIG. 4), e.g., as described above.

Figure 10:
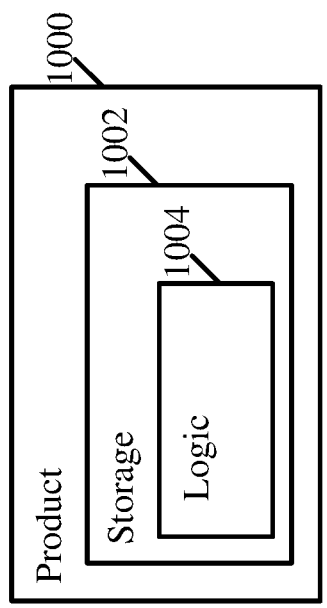
FIG. 10 is a schematic illustration of a product of manufacture, in accordance with some demonstrative embodiments.

Reference is made to FIG. 10, which schematically illustrates a product of manufacture 1000, in accordance with some demonstrative embodiments. Product 1000 may include one or more tangible computer-readable ("machine readable") non-transitory storage media 1002, which may include computer-executable instructions, e.g., implemented by logic 1004, operable to, when executed by at least one processor, e.g., computer processor, enable the at least one processor to implement one or more operations at devices 102, 140, 160 and/or 180 (FIG. 1), radios 114 and/or 144 (FIG. 1), transmitters 118 and/or 148 (FIG. 1), receivers 116 and/or 146 (FIG. 1), controllers 124 and/or 154 (FIG. 1), message processors 128 and/or 158 (FIG. 1), positioning components 117 and/or 157 (FIG. 1), and/or location estimator 115 (FIG. 1), to cause devices 102, 140, 160 and/or 180 (FIG. 1), radios 114 and/or 144 (FIG. 1), transmitters 118 and/or 148 (FIG. 1), receivers 116 and/or 146 (FIG. 1), controllers 124 and/or 154 (FIG. 1), message processors 128 and/or 158 (FIG. 1), positioning components 117 and/or 157 (FIG. 1), and/or location estimator 115 (FIG. 1) to perform one or more operations, and/or to perform, trigger and/or implement one or more operations, communications and/or functionalities described above with reference to FIGS. 1, 2, 3, 4, 5, 6, 7, 8, and/or 9, and/or one or more operations described herein. The phrases "non-transitory machine-readable media (medium)" and "computer-readable non-transitory storage media (medium)" are directed to include all computer-readable media, with the sole exception being a transitory propagating signal.

In some demonstrative embodiments, product 1000 and/or storage media 1002 may include one or more types of computer-readable storage media capable of storing data, including volatile memory, non-volatile memory, removable or non-removable memory, erasable or non-erasable memory, writeable or re-writeable memory, and the like. For example, storage media 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless communication station (STA) to determine a plurality of uplink (UL) sounding groups of STAs; transmit at least one trigger frame to at least one UL sounding group of the plurality of UL sounding groups to trigger a measurement procedure with the UL sounding group, the trigger frame comprising one or more Identifiers (IDs) to identify one or more STAs of the UL sounding group; receive one or more UL Null Data Packet (NDP) sounding frames from the one or more STAs of the UL sounding group in response to the trigger frame; transmit a downlink (DL) NDP Announcement (NDP-A) frame to the plurality of UL sounding groups; and transmit a DL NDP sounding frame to the plurality of UL sounding groups.

Example 2 includes the subject matter of Example 1, and optionally, wherein the apparatus is configured to cause the STA to transmit a first trigger frame to a first UL sounding group of the plurality of UL sounding groups, to receive one or more first UL NDP sounding frames from the first UL sounding group in response to the first trigger frame, to transmit a second trigger frame to a second UL sounding group of the plurality of UL sounding groups, to receive one or more second UL NDP sounding frames from the second UL sounding group in response to the second trigger frame, to transmit the DL NDP-A frame to the first and second UL sounding groups, and to transmit the DL NDP sounding frame to the first and second UL sounding groups.

Example 3 includes the subject matter of Example 2, and optionally, wherein the first trigger frame comprises one or more IDs to identify one or more STAs of the first UL sounding group, and the second trigger frame comprises one or more IDs to identify one or more STAs of the second UL sounding group.

Example 4 includes the subject matter of Example 2 or 3, and optionally, wherein the first trigger frame is separated from the first UL NDP sounding frames by a first Short Interframe Space (SIFS), and wherein the first UL NDP sounding frames are separated from the second trigger frame by a second SIFS.

Example 5 includes the subject matter of Example 1, and optionally, wherein the trigger frame comprises time-slot allocation information to allocate at least a first time slot for a first UL sounding group and a second time slot for a second UL sounding group, the apparatus configured to cause the STA to receive, during the first time slot, one or more first UL NDP sounding frames from the first UL sounding group, and to receive, during the second time slot, one or more second UL NDP sounding frames from the second UL sounding group.

Example 6 includes the subject matter of Example 1, and optionally, wherein the trigger frame comprises at least a first block allocation of a concatenated P-matrix for a first UL sounding group, and a second block allocation of the concatenated P-matrix for a second UL sounding group, the apparatus configured to cause the STA to process one or more first UL NDP sounding frames from the first UL sounding group based on the first block allocation, and to process one or more second UL NDP sounding frames from the second UL sounding group based on the second block allocation.

Example 7 includes the subject matter of Example 6, and optionally, wherein a first STA of the first UL sounding group is allocated one or more first columns or rows of the first block allocation, and a second STA of the first UL sounding group is allocated one or more second columns or rows of the first block allocation.

Example 8 includes the subject matter of any one of Examples 1-7, and optionally, wherein the apparatus is configured to cause the STA to determine one or more measurement values of the measurement procedure based on the UL NDP sounding frames.

Example 9 includes the subject matter of any one of Examples 1-8, and optionally, wherein the apparatus is configured to cause the STA to determine Time of Arrival (ToA) values of the one or more UL NDP sounding frames from the one or more STAs.

Example 10 includes the subject matter of any one of Examples 1-9, and optionally, wherein the apparatus is configured to cause the STA to assign the one or more STAs to the UL sounding group based on a STA type of the one or more STAs.

Example 11 includes the subject matter of any one of Examples 1-10, and optionally, wherein the apparatus is configured to cause the STA to assign the one or more STAs to the UL sounding group based on Received Signal Strength Indicators (RSSIs) corresponding to the one or more STAs.

Example 12 includes the subject matter of any one of Examples 1-11, and optionally, wherein the trigger frame comprises P-matrix code allocation information to indicate P-matrix codes of a P-matrix to be used by the one or more STAs for transmission of High Efficiency (HE) Long Training Field (LTF) symbols of the one or more UL NDP sounding frames.

Example 13 includes the subject matter of any one of Examples 1-12, and optionally, wherein the trigger frame comprises an indication of a High Efficiency (HE) Long Training Field (LTF) size and a Guard Interval (GI) size to be used by the one or more STAs for transmission of the one or more UL NDP sounding frames.

Example 14 includes the subject matter of any one of Examples 1-13, and optionally, wherein the one or more IDs in the trigger frame comprise one or more Association IDs (AIDs) or one or more Ranging IDs (RIDs) to identify the one or more STAs of the UL sounding group.

Example 15 includes the subject matter of any one of Examples 1-14, and optionally, wherein the trigger frame is separated from the UL NDP sounding frames by a Short Interframe Space (SIFS).

Example 16 includes the subject matter of any one of Examples 1-15, and optionally, wherein each UL sounding group of the plurality of UL sounding groups comprises no more than 8 STAs.

Example 17 includes the subject matter of any one of Examples 1-16, and optionally, comprising a radio to transmit the trigger frame, to receive the one or more UL NDP sounding frames, to transmit the DL NDP-A frame, and to transmit the DL NDP sounding frame.

Example 18 includes the subject matter of any one of Examples 1-17, and optionally, comprising one or more antennas, a memory, and a processor.

Example 19 includes a system of wireless communication comprising a wireless communication station (STA), the STA comprising one or more antennas; a radio; a memory; a processor; and a controller configured to cause the STA to determine a plurality of uplink (UL) sounding groups of STAs; transmit at least one trigger frame to at least one UL sounding group of the plurality of UL sounding groups to trigger a measurement procedure with the UL sounding group, the trigger frame comprising one or more Identifiers (IDs) to identify one or more STAs of the UL sounding group; receive one or more UL Null Data Packet (NDP) sounding frames from the one or more STAs of the UL sounding group in response to the trigger frame; transmit a downlink (DL) NDP Announcement (NDP-A) frame to the plurality of UL sounding groups; and transmit a DL NDP sounding frame to the plurality of UL sounding groups.

Example 20 includes the subject matter of Example 19, and optionally, wherein the controller is configured to cause the STA to transmit a first trigger frame to a first UL sounding group of the plurality of UL sounding groups, to receive one or more first UL NDP sounding frames from the first UL sounding group in response to the first trigger frame, to transmit a second trigger frame to a second UL sounding group of the plurality of UL sounding groups, to receive one or more second UL NDP sounding frames from the second UL sounding group in response to the second trigger frame, to transmit the DL NDP-A frame to the first and second UL sounding groups, and to transmit the DL NDP sounding frame to the first and second UL sounding groups.

Example 21 includes the subject matter of Example 20, and optionally, wherein the first trigger frame comprises one or more IDs to identify one or more STAs of the first UL sounding group, and the second trigger frame comprises one or more IDs to identify one or more STAs of the second UL sounding group.

Example 22 includes the subject matter of Example 20 or 21, and optionally, wherein the first trigger frame is separated from the first UL NDP sounding frames by a first Short Interframe Space (SIFS), and wherein the first UL NDP sounding frames are separated from the second trigger frame by a second SIFS.

Example 23 includes the subject matter of Example 19, and optionally, wherein the trigger frame comprises time-slot allocation information to allocate at least a first time slot for a first UL sounding group and a second time slot for a second UL sounding group, the controller configured to cause the STA to receive, during the first time slot, one or more first UL NDP sounding frames from the first UL sounding group, and to receive, during the second time slot, one or more second UL NDP sounding frames from the second UL sounding group.

Example 24 includes the subject matter of Example 19, and optionally, wherein the trigger frame comprises at least a first block allocation of a concatenated P-matrix for a first UL sounding group, and a second block allocation of the concatenated P-matrix for a second UL sounding group, the controller configured to cause the STA to process one or more first UL NDP sounding frames from the first UL sounding group based on the first block allocation, and to process one or more second UL NDP sounding frames from the second UL sounding group based on the second block allocation.

Example 25 includes the subject matter of Example 24, and optionally, wherein a first STA of the first UL sounding group is allocated one or more first columns or rows of the first block allocation, and a second STA of the first UL sounding group is allocated one or more second columns or rows of the first block allocation.

Example 26 includes the subject matter of any one of Examples 19-25, and optionally, wherein the controller is configured to cause the STA to determine one or more measurement values of the measurement procedure based on the UL NDP sounding frames.

Example 27 includes the subject matter of any one of Examples 19-26, and optionally, wherein the controller is configured to cause the STA to determine Time of Arrival (ToA) values of the one or more UL NDP sounding frames from the one or more STAs.

Example 28 includes the subject matter of any one of Examples 19-27, and optionally, wherein the controller is configured to cause the STA to assign the one or more STAs to the UL sounding group based on a STA type of the one or more STAs.

Example 29 includes the subject matter of any one of Examples 19-28, and optionally, wherein the controller is configured to cause the STA to assign the one or more STAs to the UL sounding group based on Received Signal Strength Indicators (RSSIs) corresponding to the one or more STAs.

Example 30 includes the subject matter of any one of Examples 19-29, and optionally, wherein the trigger frame comprises P-matrix code allocation information to indicate P-matrix codes of a P-matrix to be used by the one or more STAs for transmission of High Efficiency (HE) Long Training Field (LTF) symbols of the one or more UL NDP sounding frames.

Example 31 includes the subject matter of any one of Examples 19-30, and optionally, wherein the trigger frame comprises an indication of a High Efficiency (HE) Long Training Field (LTF) size and a Guard Interval (GI) size to be used by the one or more STAs for transmission of the one or more UL NDP sounding frames.

Example 32 includes the subject matter of any one of Examples 19-31, and optionally, wherein the one or more IDs in the trigger frame comprise one or more Association IDs (AIDs) or one or more Ranging IDs (RIDs) to identify the one or more STAs of the UL sounding group.

Example 33 includes the subject matter of any one of Examples 19-32, and optionally, wherein the trigger frame is separated from the UL NDP sounding frames by a Short Interframe Space (SIFS).

Example 34 includes the subject matter of any one of Examples 19-33, and optionally, wherein each UL sounding group of the plurality of UL sounding groups comprises no more than 8 STAs.

Example 35 includes a method to be performed at a wireless communication station (STA), the method comprising determining a plurality of uplink (UL) sounding groups of STAs; transmitting at least one trigger frame to at least one UL sounding group of the plurality of UL sounding groups to trigger a measurement procedure with the UL sounding group, the trigger frame comprising one or more Identifiers (IDs) to identify one or more STAs of the UL sounding group; receiving one or more UL Null Data Packet (NDP) sounding frames from the one or more STAs of the UL sounding group in response to the trigger frame; transmitting a downlink (DL) NDP Announcement (NDP-A) frame to the plurality of UL sounding groups; and transmitting a DL NDP sounding frame to the plurality of UL sounding groups.

Example 36 includes the subject matter of Example 35, and optionally, comprising transmitting a first trigger frame to a first UL sounding group of the plurality of UL sounding groups, receiving one or more first UL NDP sounding frames from the first UL sounding group in response to the first trigger frame, transmitting a second trigger frame to a second UL sounding group of the plurality of UL sounding groups, receiving one or more second UL NDP sounding frames from the second UL sounding group in response to the second trigger frame, transmitting the DL NDP-A frame to the first and second UL sounding groups, and transmitting the DL NDP sounding frame to the first and second UL sounding groups.

Example 37 includes the subject matter of Example 36, and optionally, wherein the first trigger frame comprises one or more IDs to identify one or more STAs of the first UL sounding group, and the second trigger frame comprises one or more IDs to identify one or more STAs of the second UL sounding group.

Example 38 includes the subject matter of Example 36 or 37, and optionally, wherein the first trigger frame is separated from the first UL NDP sounding frames by a first Short Interframe Space (SIFS), and wherein the first UL NDP sounding frames are separated from the second trigger frame by a second SIFS.

Example 39 includes the subject matter of Example 35, and optionally, wherein the trigger frame comprises timeslot allocation information to allocate at least a first time slot for a first UL sounding group and a second time slot for a second UL sounding group, the method comprising receiving, during the first time slot, one or more first UL NDP sounding frames from the first UL sounding group, and receiving, during the second time slot, one or more second UL NDP sounding frames from the second UL sounding group.

Example 40 includes the subject matter of Example 35, and optionally, wherein the trigger frame comprises at least a first block allocation of a concatenated P-matrix for a first UL sounding group, and a second block allocation of the concatenated P-matrix for a second UL sounding group, the method comprising processing one or more first UL NDP sounding frames from the first UL sounding group based on the first block allocation, and processing one or more second UL NDP sounding frames from the second UL sounding group based on the second block allocation.

Example 41 includes the subject matter of Example 40, and optionally, wherein a first STA of the first UL sounding group is allocated one or more first columns or rows of the first block allocation, and a second STA of the first UL sounding group is allocated one or more second columns or rows of the first block allocation.

Example 42 includes the subject matter of any one of Examples 35-41, and optionally, comprising determining one or more measurement values of the measurement procedure based on the UL NDP sounding frames.

Example 43 includes the subject matter of any one of Examples 35-42, and optionally, comprising determining Time of Arrival (ToA) values of the one or more UL NDP sounding frames from the one or more STAs.

Example 44 includes the subject matter of any one of Examples 35-43, and optionally, comprising assigning the one or more STAs to the UL sounding group based on a STA type of the one or more STAs.

Example 45 includes the subject matter of any one of Examples 35-44, and optionally, comprising assigning the one or more STAs to the UL sounding group based on Received Signal Strength Indicators (RSSIs) corresponding to the one or more STAs.

Example 46 includes the subject matter of any one of Examples 35-45, and optionally, wherein the trigger frame comprises P-matrix code allocation information to indicate P-matrix codes of a P-matrix to be used by the one or more STAs for transmission of High Efficiency (HE) Long Training Field (LTF) symbols of the one or more UL NDP sounding frames.

Example 47 includes the subject matter of any one of Examples 35-46, and optionally, wherein the trigger frame comprises an indication of a High Efficiency (HE) Long Training Field (LTF) size and a Guard Interval (GI) size to be used by the one or more STAs for transmission of the one or more UL NDP sounding frames.

Example 48 includes the subject matter of any one of Examples 35-47, and optionally, wherein the one or more IDs in the trigger frame comprise one or more Association IDs (AIDs) or one or more Ranging IDs (RIDs) to identify the one or more STAs of the UL sounding group.

Example 49 includes the subject matter of any one of Examples 35-48, and optionally, wherein the trigger frame is separated from the UL NDP sounding frames by a Short Interframe Space (SIFS).

Example 50 includes the subject matter of any one of Examples 35-49, and optionally, wherein each UL sounding group of the plurality of UL sounding groups comprises no more than 8 STAs.

Example 51 includes a product comprising one or more tangible computer-readable non-transitory storage media comprising computer-executable instructions operable to, when executed by at least one processor, enable the at least one processor to cause a wireless communication station (STA) to determine a plurality of uplink (UL) sounding groups of STAs; transmit at least one trigger frame to at least one UL sounding group of the plurality of UL sounding groups to trigger a measurement procedure with the UL sounding group, the trigger frame comprising one or more Identifiers (IDs) to identify one or more STAs of the UL sounding group; receive one or more UL Null Data Packet (NDP) sounding frames from the one or more STAs of the UL sounding group in response to the trigger frame; transmit a downlink (DL) NDP Announcement (NDP-A) frame to the plurality of UL sounding groups; and transmit a DL NDP sounding frame to the plurality of UL sounding groups.

Example 52 includes the subject matter of Example 51, and optionally, wherein the instructions, when executed, cause the STA to transmit a first trigger frame to a first UL sounding group of the plurality of UL sounding groups, to receive one or more first UL NDP sounding frames from the first UL sounding group in response to the first trigger frame, to transmit a second trigger frame to a second UL sounding group of the plurality of UL sounding groups, to receive one or more second UL NDP sounding frames from the second UL sounding group in response to the second trigger frame, to transmit the DL NDP-A frame to the first and second UL sounding groups, and to transmit the DL NDP sounding frame to the first and second UL sounding groups.

Example 53 includes the subject matter of Example 52, and optionally, wherein the first trigger frame comprises one or more IDs to identify one or more STAs of the first UL sounding group, and the second trigger frame comprises one or more IDs to identify one or more STAs of the second UL sounding group.

Example 54 includes the subject matter of Example 52 or 53, and optionally, wherein the first trigger frame is separated from the first UL NDP sounding frames by a first Short Interframe Space (SIFS), and wherein the first UL NDP sounding frames are separated from the second trigger frame by a second SIFS.

Example 55 includes the subject matter of Example 51, and optionally, wherein the trigger frame comprises timeslot allocation information to allocate at least a first time slot for a first UL sounding group and a second time slot for a second UL sounding group, the instructions, when executed, cause the STA to receive, during the first time slot, one or more first UL NDP sounding frames from the first UL sounding group, and to receive, during the second time slot, one or more second UL NDP sounding frames from the second UL sounding group.

Example 56 includes the subject matter of Example 51, and optionally, wherein the trigger frame comprises at least a first block allocation of a concatenated P-matrix for a first UL sounding group, and a second block allocation of the concatenated P-matrix for a second UL sounding group, the instructions, when executed, cause the STA to process one or more first UL NDP sounding frames from the first UL sounding group based on the first block allocation, and to process one or more second UL NDP sounding frames from the second UL sounding group based on the second block allocation.

Example 57 includes the subject matter of Example 56, and optionally, wherein a first STA of the first UL sounding group is allocated one or more first columns or rows of the first block allocation, and a second STA of the first UL sounding group is allocated one or more second columns or rows of the first block allocation.

Example 58 includes the subject matter of any one of Examples 51-57, and optionally, wherein the instructions, when executed, cause the STA to determine one or more measurement values of the measurement procedure based on the UL NDP sounding frames.

Example 59 includes the subject matter of any one of Examples 51-58, and optionally, wherein the instructions, when executed, cause the STA to determine Time of Arrival (ToA) values of the one or more UL NDP sounding frames from the one or more STAs.

Example 60 includes the subject matter of any one of Examples 51-59, and optionally, wherein the instructions, when executed, cause the STA to assign the one or more STAs to the UL sounding group based on a STA type of the one or more STAs.

Example 61 includes the subject matter of any one of Examples 51-60, and optionally, wherein the instructions, when executed, cause the STA to assign the one or more STAs to the UL sounding group based on Received Signal Strength Indicators (RSSIs) corresponding to the one or more STAs.

Example 62 includes the subject matter of any one of Examples 51-61, and optionally, wherein the trigger frame comprises P-matrix code allocation information to indicate P-matrix codes of a P-matrix to be used by the one or more STAs for transmission of High Efficiency (HE) Long Training Field (LTF) symbols of the one or more UL NDP sounding frames.

Example 63 includes the subject matter of any one of Examples 51-62, and optionally, wherein the trigger frame comprises an indication of a High Efficiency (HE) Long Training Field (LTF) size and a Guard Interval (GI) size to be used by the one or more STAs for transmission of the one or more UL NDP sounding frames.

Example 64 includes the subject matter of any one of Examples 51-63, and optionally, wherein the one or more IDs in the trigger frame comprise one or more Association IDs (AIDs) or one or more Ranging IDs (RIDs) to identify the one or more STAs of the UL sounding group.

Example 65 includes the subject matter of any one of Examples 51-64, and optionally, wherein the trigger frame is separated from the UL NDP sounding frames by a Short Interframe Space (SIFS).

Example 66 includes the subject matter of any one of Examples 51-65, and optionally, wherein each UL sounding group of the plurality of UL sounding groups comprises no more than 8 STAs.

Example 67 includes an apparatus of wireless communication by a wireless communication station (STA), the apparatus comprising means for determining a plurality of uplink (UL) sounding groups of STAs; means for transmitting at least one trigger frame to at least one UL sounding group of the plurality of UL sounding groups to trigger a measurement procedure with the UL sounding group, the trigger frame comprising one or more Identifiers (IDs) to identify one or more STAs of the UL sounding group; means for receiving one or more UL Null Data Packet (NDP) sounding frames from the one or more STAs of the UL sounding group in response to the trigger frame; means for transmitting a downlink (DL) NDP Announcement (NDP-A) frame to the plurality of UL sounding groups; and means for transmitting a DL NDP sounding frame to the plurality of UL sounding groups.

Example 68 includes the subject matter of Example 67, and optionally, comprising means for transmitting a first trigger frame to a first UL sounding group of the plurality of UL sounding groups, receiving one or more first UL NDP sounding frames from the first UL sounding group in response to the first trigger frame, transmitting a second trigger frame to a second UL sounding group of the plurality of UL sounding groups, receiving one or more second UL NDP sounding frames from the second UL sounding group in response to the second trigger frame, transmitting the DL NDP-A frame to the first and second UL sounding groups, and transmitting the DL NDP sounding frame to the first and second UL sounding groups.

Example 69 includes the subject matter of Example 68, and optionally, wherein the first trigger frame comprises one or more IDs to identify one or more STAs of the first UL sounding group, and the second trigger frame comprises one or more IDs to identify one or more STAs of the second UL sounding group.

Example 70 includes the subject matter of Example 68 or 69, and optionally, wherein the first trigger frame is separated from the first UL NDP sounding frames by a first Short Interframe Space (SIFS), and wherein the first UL NDP sounding frames are separated from the second trigger frame by a second SIFS.

Example 71 includes the subject matter of Example 67, and optionally, wherein the trigger frame comprises timeslot allocation information to allocate at least a first time slot for a first UL sounding group and a second time slot for a second UL sounding group, the apparatus comprising means for receiving, during the first time slot, one or more first UL NDP sounding frames from the first UL sounding group, and receiving, during the second time slot, one or more second UL NDP sounding frames from the second UL sounding group.

Example 72 includes the subject matter of Example 67, and optionally, wherein the trigger frame comprises at least a first block allocation of a concatenated P-matrix for a first UL sounding group, and a second block allocation of the concatenated P-matrix for a second UL sounding group, the apparatus comprising means for processing one or more first UL NDP sounding frames from the first UL sounding group based on the first block allocation, and processing one or more second UL NDP sounding frames from the second UL sounding group based on the second block allocation.

Example 73 includes the subject matter of Example 72, and optionally, wherein a first STA of the first UL sounding group is allocated one or more first columns or rows of the first block allocation, and a second STA of the first UL sounding group is allocated one or more second columns or rows of the first block allocation.

Example 74 includes the subject matter of any one of Examples 67-73, and optionally, comprising means for determining one or more measurement values of the measurement procedure based on the UL NDP sounding frames.

Example 75 includes the subject matter of any one of Examples 67-74, and optionally, comprising means for determining Time of Arrival (ToA) values of the one or more UL NDP sounding frames from the one or more STAs.

Example 76 includes the subject matter of any one of Examples 67-75, and optionally, comprising means for assigning the one or more STAs to the UL sounding group based on a STA type of the one or more STAs.

Example 77 includes the subject matter of any one of Examples 67-76, and optionally, comprising means for assigning the one or more STAs to the UL sounding group based on Received Signal Strength Indicators (RSSIs) corresponding to the one or more STAs.

Example 78 includes the subject matter of any one of Examples 67-77, and optionally, wherein the trigger frame comprises P-matrix code allocation information to indicate P-matrix codes of a P-matrix to be used by the one or more STAs for transmission of High Efficiency (HE) Long Training Field (LTF) symbols of the one or more UL NDP sounding frames.

Example 79 includes the subject matter of any one of Examples 67-78, and optionally, wherein the trigger frame comprises an indication of a High Efficiency (HE) Long Training Field (LTF) size and a Guard Interval (GI) size to be used by the one or more STAs for transmission of the one or more UL NDP sounding frames.

Example 80 includes the subject matter of any one of Examples 67-79, and optionally, wherein the one or more IDs in the trigger frame comprise one or more Association IDs (AIDs) or one or more Ranging IDs (RIDs) to identify the one or more STAs of the UL sounding group.

Example 81 includes the subject matter of any one of Examples 67-80, and optionally, wherein the trigger frame is separated from the UL NDP sounding frames by a Short Interframe Space (SIFS).

Example 82 includes the subject matter of any one of Examples 67-81, and optionally, wherein each UL sounding group of the plurality of UL sounding groups comprises no more than 8 STAs.

Example 83 includes an apparatus comprising logic and circuitry configured to cause a first wireless communication station (STA) to receive a trigger frame from a second STA to trigger a measurement procedure with the second STA, the trigger frame comprising allocation information to allocate at least a first allocation for a first UL sounding group, and a second allocation for a second UL sounding group, the first UL sounding group comprising at least the first STA, the second UL sounding group comprising at least a third STA; transmit a UL Null Data Packet (NDP) sounding frame to the second STA based on the first allocation for the first UL sounding group; receive a downlink (DL) NDP Announcement (NDP-A) frame from the second STA after transmission of the UL NDP sounding frame; and receive a DL NDP sounding frame from the second STA after the DL NDP-A frame.

Example 84 includes the subject matter of Example 83, and optionally, wherein the allocation information comprises time-slot allocation information to allocate at least a first time slot for the first UL sounding group and a second time slot for the second UL sounding group, the apparatus configured to cause the first STA to transmit the UL NDP sounding frame during the first time slot.

Example 85 includes the subject matter of Example 83, and optionally, wherein the allocation information comprises at least a first block allocation of a concatenated P-matrix for the first UL sounding group, and a second block allocation of the concatenated P-matrix for the second UL sounding group.

Example 86 includes the subject matter of Example 85, and optionally, wherein the apparatus is configured to cause the first STA to transmit the UL NDP sounding frame based on one or more columns or rows of the first block allocation.

Example 87 includes the subject matter of any one of Examples 83-86, and optionally, wherein the trigger frame comprises one or more Identifiers (IDs) to identify one or more STAs of the first UL sounding group.

Example 88 includes the subject matter of Example 87, and optionally, wherein the one or more IDs in the trigger frame comprise one or more Association IDs (AIDs) or one or more ranging IDs (RIDs) to identify the one or more STAs of the first UL sounding group.

Example 89 includes the subject matter of any one of Examples 83-88, and optionally, wherein the allocation information comprises P-matrix code allocation information to indicate a P-matrix code of a P-matrix for the first STA, the apparatus configured to cause the first STA to transmit the UL NDP sounding frame according to the P-matrix code.

Example 90 includes the subject matter of any one of Examples 83-89, and optionally, wherein the allocation information comprises an indication of a High Efficiency (HE) Long Training Field (LTF) (HE-LTF) size and a Guard Interval (GI) size, the apparatus configured to cause the first STA to transmit the UL NDP sounding frame according to the HE-LTF size and the GI size.

Example 91 includes the subject matter of any one of Examples 83-90, and optionally, wherein the trigger frame is separated from the UL NDP sounding frame by a Short Interframe Space (SIFS).

Example 92 includes the subject matter of any one of Examples 83-91, and optionally, wherein the first UL sounding group comprises no more than 8 STAs.

Example 93 includes the subject matter of any one of Examples 83-92, and optionally, comprising a radio to receive the trigger frame, to transmit the UL NDP sounding frame, to receive the DL NDP-A frame, and to receive the DL NDP sounding frame.

Example 94 includes the subject matter of any one of Examples 83-93, and optionally, comprising one or more antennas, a memory, and a processor.

Example 95 includes a system of wireless communication comprising a first wireless communication station (STA), the first STA comprising one or more antennas; a radio; a memory; a processor; and a controller configured to cause the first STA to receive a trigger frame from a second STA to trigger a measurement procedure with the second STA, the trigger frame comprising allocation information to allocate at least a first allocation for a first UL sounding group, and a second allocation for a second UL sounding group, the first UL sounding group comprising at least the first STA, the second UL sounding group comprising at least a third STA; transmit a UL Null Data Packet (NDP) sounding frame to the second STA based on the first allocation for the first UL sounding group; receive a downlink (DL) NDP Announcement (NDP-A) frame from the second STA after transmission of the UL NDP sounding frame; and receive a DL NDP sounding frame from the second STA after the DL NDP-A frame.

Example 96 includes the subject matter of Example 95, and optionally, wherein the allocation information comprises time-slot allocation information to allocate at least a first time slot for the first UL sounding group and a second time slot for the second UL sounding group, the controller configured to cause the first STA to transmit the UL NDP sounding frame during the first time slot.

Example 97 includes the subject matter of Example 95, and optionally, wherein the allocation information comprises at least a first block allocation of a concatenated P-matrix for the first UL sounding group, and a second block allocation of the concatenated P-matrix for the second UL sounding group.

Example 98 includes the subject matter of Example 97, and optionally, wherein the controller is configured to cause the first STA to transmit the UL NDP sounding frame based on one or more columns or rows of the first block allocation.

Example 99 includes the subject matter of any one of Examples 95-98, and optionally, wherein the trigger frame comprises one or more Identifiers (IDs) to identify one or more STAs of the first UL sounding group.

Example 100 includes the subject matter of Example 99, and optionally, wherein the one or more IDs in the trigger frame comprise one or more Association IDs (AIDs) or one or more ranging IDs (RIDs) to identify the one or more STAs of the first UL sounding group.

Example 101 includes the subject matter of any one of Examples 95-100, and optionally, wherein the allocation information comprises P-matrix code allocation information to indicate a P-matrix code of a P-matrix for the first STA, the controller configured to cause the first STA to transmit the UL NDP sounding frame according to the P-matrix code.

Example 102 includes the subject matter of any one of Examples 95-101, and optionally, wherein the allocation information comprises an indication of a High Efficiency (HE) Long Training Field (LTF) (HE-LTF) size and a Guard Interval (GI) size, the controller configured to cause the first STA to transmit the UL NDP sounding frame according to the HE-LTF size and the GI size.

Example 103 includes the subject matter of any one of Examples 95-102, and optionally, wherein the trigger frame is separated from the UL NDP sounding frame by a Short Interframe Space (SIFS).

Example 104 includes the subject matter of any one of Examples 95-103, and optionally, wherein the first UL sounding group comprises no more than 8 STAs.

Example 105 includes a method to be performed at a first wireless communication station (STA), the method comprising receiving a trigger frame from a second STA to trigger a measurement procedure with the second STA, the trigger frame comprising allocation information to allocate at least a first allocation for a first UL sounding group, and a second allocation for a second UL sounding group, the first UL sounding group comprising at least the first STA, the second UL sounding group comprising at least a third STA; transmitting a UL Null Data Packet (NDP) sounding frame to the second STA based on the first allocation for the first UL sounding group; receiving a downlink (DL) NDP Announcement (NDP-A) frame from the second STA after transmission of the UL NDP sounding frame; and receiving a DL NDP sounding frame from the second STA after the DL NDP-A frame.

Example 106 includes the subject matter of Example 105, and optionally, wherein the allocation information comprises time-slot allocation information to allocate at least a first time slot for the first UL sounding group and a second time slot for the second UL sounding group, the method comprising transmitting the UL NDP sounding frame during the first time slot.

Example 107 includes the subject matter of Example 105, and optionally, wherein the allocation information comprises at least a first block allocation of a concatenated P-matrix for the first UL sounding group, and a second block allocation of the concatenated P-matrix for the second UL sounding group.

Example 108 includes the subject matter of Example 107, and optionally, comprising transmitting the UL NDP sounding frame based on one or more columns or rows of the first block allocation.

Example 109 includes the subject matter of any one of Examples 105-108, and optionally, wherein the trigger frame comprises one or more Identifiers (IDs) to identify one or more STAs of the first UL sounding group.

Example 110 includes the subject matter of Example 109, and optionally, wherein the one or more IDs in the trigger frame comprise one or more Association IDs (AIDs) or one or more ranging IDs (RIDs) to identify the one or more STAs of the first UL sounding group.

Example 111 includes the subject matter of any one of Examples 105-110, and optionally, wherein the allocation information comprises P-matrix code allocation information to indicate a P-matrix code of a P-matrix for the first STA, the method comprising transmitting the UL NDP sounding frame according to the P-matrix code.

Example 112 includes the subject matter of any one of Examples 105-111, and optionally, wherein the allocation information comprises an indication of a High Efficiency (HE) Long Training Field (LTF) (HE-LTF) size and a Guard Interval (GI) size, the method comprising transmitting the UL NDP sounding frame according to the HE-LTF size and the GI size.

Example 113 includes the subject matter of any one of Examples 105-112, and optionally, wherein the trigger frame is separated from the UL NDP sounding frame by a Short Interframe Space (SIFS).

Example 114 includes the subject matter of any one of Examples 105-113, and optionally, wherein the first UL sounding group comprises no more than 8 STAs.

Example 115 includes a product comprising one or more tangible computer-readable non-transitory storage media comprising computer-executable instructions operable to, when executed by at least one processor, enable the at least one processor to cause a first wireless communication station (STA) to receive a trigger frame from a second STA to trigger a measurement procedure with the second STA, the trigger frame comprising allocation information to allocate at least a first allocation for a first UL sounding group, and a second allocation for a second UL sounding group, the first UL sounding group comprising at least the first STA, the second UL sounding group comprising at least a third STA; transmit a UL Null Data Packet (NDP) sounding frame to the second STA based on the first allocation for the first UL sounding group; receive a downlink (DL) NDP Announcement (NDP-A) frame from the second STA after transmission of the UL NDP sounding frame; and receive a DL NDP sounding frame from the second STA after the DL NDP-A frame.

Example 116 includes the subject matter of Example 115, and optionally, wherein the allocation information comprises time-slot allocation information to allocate at least a first time slot for the first UL sounding group and a second time slot for the second UL sounding group, the instructions, when executed, cause the first STA to transmit the UL NDP sounding frame during the first time slot.

Example 117 includes the subject matter of Example 115, and optionally, wherein the allocation information comprises at least a first block allocation of a concatenated P-matrix for the first UL sounding group, and a second block allocation of the concatenated P-matrix for the second UL sounding group.

Example 118 includes the subject matter of Example 117, and optionally, wherein the instructions, when executed, cause the first STA to transmit the UL NDP sounding frame based on one or more columns or rows of the first block allocation.

Example 119 includes the subject matter of any one of Examples 115-118, and optionally, wherein the trigger frame comprises one or more Identifiers (IDs) to identify one or more STAs of the first UL sounding group.

Example 120 includes the subject matter of Example 119, and optionally, wherein the one or more IDs in the trigger frame comprise one or more Association IDs (AIDs) or one or more ranging IDs (RIDs) to identify the one or more STAs of the first UL sounding group.

Example 121 includes the subject matter of any one of Examples 115-120, and optionally, wherein the allocation information comprises P-matrix code allocation information to indicate a P-matrix code of a P-matrix for the first STA, the instructions, when executed, cause the first STA to transmit the UL NDP sounding frame according to the P-matrix code.

Example 122 includes the subject matter of any one of Examples 115-121, and optionally, wherein the allocation information comprises an indication of a High Efficiency (HE) Long Training Field (LTF) (HE-LTF) size and a Guard Interval (GI) size, the instructions, when executed, cause the first STA to transmit the UL NDP sounding frame according to the HE-LTF size and the GI size.

Example 123 includes the subject matter of any one of Examples 115-122, and optionally, wherein the trigger frame is separated from the UL NDP sounding frame by a Short Interframe Space (SIFS).

Example 124 includes the subject matter of any one of Examples 115-123, and optionally, wherein the first UL sounding group comprises no more than 8 STAs.

Example 125 includes an apparatus of wireless communication by a first wireless communication station (STA), the apparatus comprising means for receiving a trigger frame from a second STA to trigger a measurement procedure with the second STA, the trigger frame comprising allocation information to allocate at least a first allocation for a first UL sounding group, and a second allocation for a second UL sounding group, the first UL sounding group comprising at least the first STA, the second UL sounding group comprising at least a third STA; means for transmitting a UL Null Data Packet (NDP) sounding frame to the second STA based on the first allocation for the first UL sounding group; means for receiving a downlink (DL) NDP Announcement (NDP-A) frame from the second STA after transmission of the UL NDP sounding frame; and means for receiving a DL NDP sounding frame from the second STA after the DL NDP-A frame.

Example 126 includes the subject matter of Example 125, and optionally, wherein the allocation information comprises time-slot allocation information to allocate at least a first time slot for the first UL sounding group and a second time slot for the second UL sounding group, the apparatus comprising means for transmitting the UL NDP sounding frame during the first time slot.

Example 127 includes the subject matter of Example 125, and optionally, wherein the allocation information comprises at least a first block allocation of a concatenated P-matrix for the first UL sounding group, and a second block allocation of the concatenated P-matrix for the second UL sounding group.

Example 128 includes the subject matter of Example 127, and optionally, comprising means for transmitting the UL NDP sounding frame based on one or more columns or rows of the first block allocation.

Example 129 includes the subject matter of any one of Examples 125-128, and optionally, wherein the trigger frame comprises one or more Identifiers (IDs) to identify one or more STAs of the first UL sounding group.

Example 130 includes the subject matter of Example 129, and optionally, wherein the one or more IDs in the trigger frame comprise one or more Association IDs (AIDs) or one or more ranging IDs (RIDs) to identify the one or more STAs of the first UL sounding group.

Example 131 includes the subject matter of any one of Examples 125-130, and optionally, wherein the allocation information comprises P-matrix code allocation information to indicate a P-matrix code of a P-matrix for the first STA, the apparatus comprising means for transmitting the UL NDP sounding frame according to the P-matrix code.

Example 132 includes the subject matter of any one of Examples 125-131, and optionally, wherein the allocation information comprises an indication of a High Efficiency (HE) Long Training Field (LTF) (HE-LTF) size and a Guard Interval (GI) size, the apparatus comprising means for transmitting the UL NDP sounding frame according to the HE-LTF size and the GI size.

Example 133 includes the subject matter of any one of Examples 125-132, and optionally, wherein the trigger frame is separated from the UL NDP sounding frame by a Short Interframe Space (SIFS).

Example 134 includes the subject matter of any one of Examples 125-133, and optionally, wherein the first UL sounding group comprises no more than 8 STAs.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
memory circuitry; and
a processor comprising logic and circuitry configured to cause a responder wireless communication station (STA) to:
transmit a first Trigger Frame (TF) to allocate a first Uplink (UL) allocation to one or more first initiator STAs;
process one or more first Null-Data-Packet (NDP) transmissions from the one or more first initiator STAs, respectively, according to the first UL allocation;
transmit a second TF to allocate a second UL allocation to one or more second initiator STAs;
process one or more second NDP transmissions from the one or more second initiator STAs, respectively, according to the second UL allocation;
transmit an NDP Announcement (NDPA) to all of the one or more first initiator STAs and the one or more second initiator STAs after the one or more second NDP transmissions; and
a Short Inter-Frame Space (SIFS) after the NDPA, transmit an NDP from the responder STA.

2. The apparatus of claim 1, wherein the first TF comprises first address information to address the one or more first initiator STAs, and the second TF comprises second address information to address the one or more second initiator STAs.

3. The apparatus of claim 1, wherein the first TF comprises one or more first Identifiers (IDs) to identify the one or more first STAs, respectively, and wherein the second TF comprises one or more second IDs to identify the one or more second STAs, respectively.

4. The apparatus of claim 3, wherein an ID of the one or more first IDs comprises an Associated ID (AID) or a Ranging ID (RID).

5. The apparatus of claim 1, wherein the one or more first initiator STAs comprise a plurality of first initiator STAs, the one or more first NDP transmissions comprise a plurality of first NDP transmissions from the plurality of first initiator STAs, respectively.

6. The apparatus of claim 5, wherein the one or more second initiator STAs comprise a plurality of second initiator STAs, and the one or more second NDP transmissions comprise a plurality of second NDP transmissions from the plurality of second initiator STAs, respectively.

7. The apparatus of claim 1 configured to cause the responder STA to transmit the second TF a SIFS after the one or more first NDP transmissions, and to transmit the NDPA a SIFS after the one or more second NDP transmissions.

8. The apparatus of claim 1, wherein the NDP from the responder STA is configured for sounding measurements by all of the one or more first initiator STAs and the one or more second initiator STAs.

9. The apparatus of claim 1 comprising a radio, the processor configured to cause the radio to transmit the first TF, the second TF, the NDPA and the NDP.

10. The apparatus of claim 9 comprising one or more antennas connected to the radio, another memory to store data processed by the responder STA, and another processor to execute instructions of an operating system.

11. A product comprising one or more tangible computer-readable non-transitory storage media comprising computer-executable instructions operable to, when executed by at least one processor, enable the at least one processor to cause a responder wireless communication station (STA) to:
transmit a first Trigger Frame (TF) to allocate a first Uplink (UL) allocation to one or more first initiator STAs;
process one or more first Null-Data-Packet (NDP) transmissions from the one or more first initiator STAs, respectively, according to the first UL allocation;
transmit a second TF to allocate a second UL allocation to one or more second initiator STAs;
process one or more second NDP transmissions from the one or more second initiator STAs, respectively, according to the second UL allocation;
transmit an NDP Announcement (NDPA) to all of the one or more first initiator STAs and the one or more second initiator STAs after the one or more second NDP transmissions; and
a Short Inter-Frame Space (SIFS) after the NDPA, transmit an NDP from the responder STA.

12. The product of claim 11, wherein the first TF comprises first address information to address the one or more first initiator STAs, and the second TF comprises second address information to address the one or more second initiator STAs.

13. The product of claim 11, wherein the first TF comprises one or more first Identifiers (IDs) to identify the one or more first STAs, respectively, and wherein the second TF comprises one or more second IDs to identify the one or more second STAs, respectively.

14. The product of claim 13, wherein an ID of the one or more first IDs comprises an Associated ID (AID) or a Ranging ID (RID).

15. The product of claim 11, wherein the one or more first initiator STAs comprise a plurality of first initiator STAs, the one or more first NDP transmissions comprise a plurality of first NDP transmissions from the plurality of first initiator STAs, respectively.

16. The product of claim 15, wherein the one or more second initiator STAs comprise a plurality of second initiator STAs, and the one or more second NDP transmissions comprise a plurality of second NDP transmissions from the plurality of second initiator STAs, respectively.

17. The product of claim 11, wherein the instructions, when executed, cause the responder STA to transmit the second TF a SIFS after the one or more first NDP transmissions, and to transmit the NDPA a SIFS after the one or more second NDP transmissions.

18. The product of claim 11, wherein the NDP from the responder STA is configured for sounding measurements by all of the one or more first initiator STAs and the one or more second initiator STAs.

19. An apparatus comprising:
- means for causing a responder wireless communication station (STA) to transmit a first Trigger Frame (TF) to allocate a first Uplink (UL) allocation to one or more first initiator STAs;
- means for processing one or more first Null-Data-Packet (NDP) transmissions from the one or more first initiator STAs, respectively, according to the first UL allocation;
- means for causing the responder STA to transmit a second TF to allocate a second UL allocation to one or more second initiator STAs;
- means for processing one or more second NDP transmissions from the one or more second initiator STAs, respectively, according to the second UL allocation;
- means for causing the responder STA to transmit an NDP Announcement (NDPA) to all of the one or more first initiator STAs and the one or more second initiator STAs after the one or more second NDP transmissions; and
- means for causing the responder STA to, a Short Inter-Frame Space (SIFS) after the NDPA, transmit an NDP from the responder STA.

20. The apparatus of claim 19, wherein the first TF comprises first address information to address the one or more first initiator STAs, and the second TF comprises second address information to address the one or more second initiator STAs.

21. The apparatus of claim 19, wherein the first TF comprises one or more first Identifiers (IDs) to identify the one or more first STAs, respectively, and wherein the second TF comprises one or more second IDs to identify the one or more second STAs, respectively.

* * * * *